(12) United States Patent
Cheng et al.

(10) Patent No.: US 11,792,843 B2
(45) Date of Patent: Oct. 17, 2023

(54) BEAM RECOVERY IN A MULTIPLE BANDWIDTH PART ENVIRONMENT

(71) Applicant: Qualcomm Incorporated, San Diego, CA (US)

(72) Inventors: Peng Cheng, Beijing (CN); Chao Wei, Beijing (CN); Yu Zhang, Beijing (CN); Hao Xu, Beijing (CN); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/961,207

(22) PCT Filed: Jan. 9, 2018

(86) PCT No.: PCT/CN2018/071877
§ 371 (c)(1),
(2) Date: Jul. 9, 2020

(87) PCT Pub. No.: WO2019/136587
PCT Pub. Date: Jul. 18, 2019

(65) Prior Publication Data
US 2020/0374923 A1      Nov. 26, 2020

(51) Int. Cl.
*H04W 74/00*     (2009.01)
*H04W 74/08*     (2009.01)
(Continued)

(52) U.S. Cl.
CPC ........ *H04W 74/008* (2013.01); *H04B 7/0626* (2013.01); *H04L 5/0051* (2013.01);
(Continued)

(58) Field of Classification Search
CPC ............... H04W 16/28; H04W 74/008; H04W 74/0833; H04W 76/18; H04W 76/27;
(Continued)

(56) References Cited

U.S. PATENT DOCUMENTS

2019/0149421 A1*  5/2019  Jin ................... H04L 5/0053
                                                    370/331
2020/0367079 A1* 11/2020  Chen ................ H04W 24/08
(Continued)

FOREIGN PATENT DOCUMENTS

CN       107493605 A      12/2017
KR       101611290 B1      4/2016
WO    WO-2011015097 A1     2/2011

OTHER PUBLICATIONS

3GPP TS 38.213: "3GPP 3rd Generation Partnership Project; Technical Specification Group Radio Access Network; NR; Physical Layer Procedures for Control (Release 15)," Version. V15.0.0, Dec. 31, 2017 (Dec. 31, 2017), 56 pages.
(Continued)

*Primary Examiner* — Derrick V Rose
(74) *Attorney, Agent, or Firm* — Danai Nelisile Mhembere; Holland & Hart LLP

(57) ABSTRACT

Methods, systems, and devices for wireless communications in a multiple bandwidth part environment are described. In response to a serving beam failure in an active bandwidth part, the UE may determine a level of support provided by the active bandwidth part for a random access procedure, and may determine a contingency (e.g. fallback) bandwidth part that supports the random access procedure. In some cases, the UE may identify the contingency bandwidth as an initial bandwidth part used by the UE for a prior random access procedure. In some cases, the base station may send to the UE, an explicit indication of the contingency bandwidth part. In some cases, the UE may identify the contingency bandwidth part based on a reference signal. Upon determining the contingency bandwidth part, the UE may perform the random access procedure using the contingency bandwidth part.

31 Claims, 16 Drawing Sheets

(51) Int. Cl.
H04W 16/28 (2009.01)
H04W 76/18 (2018.01)
H04L 5/00 (2006.01)
H04W 76/27 (2018.01)
H04B 7/06 (2006.01)

(52) U.S. Cl.
CPC ........... *H04L 5/0092* (2013.01); *H04W 16/28* (2013.01); *H04W 74/0833* (2013.01); *H04W 76/18* (2018.02); *H04W 76/27* (2018.02)

(58) Field of Classification Search
CPC ............. H04W 72/02; H04W 72/0453; H04W 72/046; H04B 7/0626; H04B 7/0602; H04L 5/0051; H04L 5/0092
See application file for complete search history.

(56) References Cited

U.S. PATENT DOCUMENTS

2020/0374960 A1* 11/2020 Deenoo ................. H04W 72/14
2020/0389282 A1* 12/2020 Turtinen ............... H04L 5/0092

OTHER PUBLICATIONS

International Search Report and Written Opinion—PCT/CN2018/071877—ISA/EPO—dated Jun. 27, 2018.
Huawei, et al., "General Views on Beam Failure Recovery", 3GPP Draft, 3GPP TSG RAN WG1 NR Ad Hoc Meeting, R1-1709929, 3rd Generation Partnership Project (3GPP), Mobile Competence Centre, 650, Route Des Lucioles, F-06921, Sophia-Antipolis Cedex, France, vol. RAN WG1, No. Qingdao, China, Jun. 27, 2017-Jun. 30, 2017, Jun. 26, 2017 (Jun. 26, 2017), XP051299154, 8 pages, Retrieved from the Internet: URL: http://www.3gpp.org/ftp/Meetings_3GPP_SYNC/RAN1/Docs/ [retrieved on Jun. 26, 2017], Section 2.3.
Mediatek Inc: "Discussion on Beam Recovery Mechanism," 3GPP Draft, 3GPP TSG RAN WG1 Meeting #89 , R1-1707832_BEAMRECOVERYMECHANISM_FINAL, 3rd Generation Partnership Project (3GPP), Mobile Competence Centre, 650, Route Des Lucioles, F-06921, Sophia-Antipolis Cedex, France, vol. AN WG1, No. Hangzhou, China, May 15, 2017-May 19, 2017, May 14, 2017, XP051273033, 7 pages, Retrieved from the Internet: URL : http://www.3gpp.org/ftp/Meetings_3GPP_SYNC/RAN1/Docs/ [retrieved on May 14, 2017], the whole document.
Mediatek Inc: "Further Details on Beam Failure Recovery", 3GPP Draft, 3GPP TSG RAN WG1 Meeting #91, R1-1719566_BEAMRECOVERY_FINAL, 3rd Generation Partnership Project (3GPP), Mobile Competence Centre, 650, Route Des Lucioles, F-06921, Sophia-Antipolis Cedex, France, vol. RAN WG1, No. Reno, USA; Nov. 27, 2017-Dec. 1, 2017, Nov. 18, 2017 (Nov. 18, 2017), XP051369380, 6 pages, Retrieved from the Internet: URL: http://www.3gpp.org/ftp/tsg%5Fran/WG1%5FRL1/TSGR1%5F91/Docs/ [retrieved on Nov. 18, 2017], Section 2, 5.
Samsung: "NR Details of Beam Recovery Procedure", 3GPP Draft, 3GPP TSG-RAN WG2 2017 RAN2#99bis Meeting , R2-1711719 NR Details of Beam Recovery Procedure, 3rd Generation Partnership Project (3GPP), Mobile Competence Centre, 650, Route Des Lucioles, F-06921 Sophia-Antipolis Cedex, France, vol. RAN WG2. No. Prague, Czech; Oct. 9, 2017-Oct. 13, 2017, Oct. 8, 2017(Oct. 8, 2017), 4 Pages, XP051343677, Retrieved from the Internet: URL: https://www.3gpp.org/ftp/Meetings_3GPP_SYNC/RAN2/Docs/ [retrieved on Oct. 8, 2017], section 2.
Supplementary European Search Report—EP18899954—Search Authority—Munich—dated Jul. 27, 2021.
NTT DOCOMO, Inc: "Reducing the Maximum Time between Packet Arrival and Selected Resource for Data Transmission", 3GPP TSG RAN WG1 Meeting#90, R1-1713885, Prague, Czechia, Aug. 14-18, 2017, Aug. 11, 2017, pp. 1-2.
Samsung: "On Bandwidth Part Operation", 3GPP TSG RAN WG1 Meeting #91, R1-1720349, Reno, USA, Nov. 27-Dec. 1, 2017, Nov. 17, 2017, 5 Pages.
Ericsson: "BWP and Random Access", 3GPP TSG-RAN WG1 91, R1-1721425, Reno, USA, Nov. 27-Dec. 1, 2017, 3 Pages.
QUALCOMM Incorporated: "BWPs for Random Access in Connected Mode", 3GPP TSG-RAN WG2 Meeting RAN2#99, R2-1713806, Reno, USA, Nov. 27-Dec. 1, 2017, 3 Pages.

* cited by examiner

BEAM RECOVERY IN A MULTIPLE BANDWIDTH PART ENVIRONMENT

CROSS REFERENCE

The present application is a 371 national phase filing of International Patent Application No. PCT/CN2018/071877 by Cheng et al. entitled "BEAM RECOVERY IN A MULTIPLE BANDWIDTH PART ENVIRONMENT," filed Jan. 9, 2018, assigned to the assignee hereof.

BACKGROUND

The following relates generally to wireless communication, and more specifically to beam recovery in a multiple bandwidth part environment.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, individual carriers may be subdivided into portions, each portion having a smaller bandwidth than the carrier bandwidth— such portions may be referred to as bandwidth parts. Some base stations and UEs may also communicate using beams, which may also be referred to as directional transmissions. Systems and techniques for beam recovery in a multiple bandwidth part environment are desired.

SUMMARY

The described techniques relate to improved methods, systems, devices, or apparatuses that support beam recovery in a multiple bandwidth part environment. Generally, the described techniques provide for a user equipment (UE) determining a contingency bandwidth part of a carrier that a UE may use to perform a random access procedure in the event of a serving beam failure in an active bandwidth part of the carrier.

A UE may initially establish wireless communications with a base station in a first bandwidth part, which may be referred to as an initial bandwidth part. Thereafter, the base station may configure the UE to use a different bandwidth part for wireless communications with the base station. A bandwidth part in use by a UE at a given time may be referred to as an active bandwidth part. In response to a serving beam failure in an active bandwidth part, the UE may determine a level of support provided by the active bandwidth part for a random access procedure, and may determine a contingency (e.g. fallback) bandwidth part that supports the random access procedure. In some cases, the UE may identify the contingency bandwidth as the initial bandwidth part. In some cases, the base station may send to the UE, an explicit indication of the contingency bandwidth part. In some cases, the UE may identify the contingency bandwidth part based on a reference signal. Upon determining the contingency bandwidth part, the UE may perform the random access procedure using the contingency bandwidth part.

A method of wireless communication at a user equipment UE is described. The method may include identifying a failure of a serving beam in an active bandwidth part of a carrier utilized by the UE for wireless communication, determining, for the active bandwidth part of the carrier, a level of support for a random access procedure, determining, based at least in part on the failure of the serving beam and the level of support, a contingency bandwidth part of the carrier supporting the random access procedure, and performing the random access procedure using the contingency bandwidth part of the carrier.

An apparatus for wireless communication at a user equipment UE is described. The apparatus may include means for identifying a failure of a serving beam in an active bandwidth part of a carrier utilized by the UE for wireless communication, means for determining, for the active bandwidth part of the carrier, a level of support for a random access procedure, means for determining, based at least in part on the failure of the serving beam and the level of support, a contingency bandwidth part of the carrier supporting the random access procedure, and means for performing the random access procedure using the contingency bandwidth part of the carrier.

Another apparatus for wireless communication is at a user equipment UE described. The apparatus may include a processor, memory in electronic communication with the processor, and instructions stored in the memory. The instructions may be operable to cause the processor to identify a failure of a serving beam in an active bandwidth part of a carrier utilized by the UE for wireless communication, determine, for the active bandwidth part of the carrier, a level of support for a random access procedure, determine, based at least in part on the failure of the serving beam and the level of support, a contingency bandwidth part of the carrier supporting the random access procedure, and perform the random access procedure using the contingency bandwidth part of the carrier.

A non-transitory computer-readable medium for wireless communication at a user equipment UE is described. The non-transitory computer-readable medium may include instructions operable to cause a processor to identify a failure of a serving beam in an active bandwidth part of a carrier utilized by the UE for wireless communication, determine, for the active bandwidth part of the carrier, a level of support for a random access procedure, determine, based at least in part on the failure of the serving beam and the level of support, a contingency bandwidth part of the carrier supporting the random access procedure, and perform the random access procedure using the contingency bandwidth part of the carrier.

Some examples of the method, apparatus, and non-transitory computer-readable medium described above may further include processes, features, means, or instructions for receiving, via a receiver, configuration information from a base station, and configuring, based at least in part on the configuration information, the receiver or a transmitter to use the active bandwidth part of the carrier.

Some examples of the method, apparatus, and non-transitory computer-readable medium described above may further include processes, features, means, or instructions for configuring, based at least in part on determining the contingency bandwidth part of the carrier, a receiver or a transmitter to use the contingency bandwidth part of the carrier.

Some examples of the method, apparatus, and non-transitory computer-readable medium described above may further include processes, features, means, or instructions for determining the contingency bandwidth part of the carrier based at least in part on a prior random access procedure.

In some examples of the method, apparatus, and non-transitory computer-readable medium described above, determining the contingency bandwidth part of the carrier comprises identifying an initial bandwidth part of the carrier as used for the prior random access procedure. Some examples of the method, apparatus, and non-transitory computer-readable medium described above may further include processes, features, means, or instructions for determining the contingency bandwidth part of the carrier as the initial bandwidth part of the carrier.

Some examples of the method, apparatus, and non-transitory computer-readable medium described above may further include processes, features, means, or instructions for receiving, from a base station, an indication of the contingency bandwidth part of the carrier.

Some examples of the method, apparatus, and non-transitory computer-readable medium described above may further include processes, features, means, or instructions for receiving the indication of the contingency bandwidth part of the carrier via radio resource control (RRC) signaling.

Some examples of the method, apparatus, and non-transitory computer-readable medium described above may further include processes, features, means, or instructions for determining the contingency bandwidth part of the carrier based at least in part on a reference signal transmitted in the active bandwidth part of the carrier.

Some examples of the method, apparatus, and non-transitory computer-readable medium described above may further include processes, features, means, or instructions for identifying a mapping between the reference signal and a beam comprising a random access resource. Some examples of the method, apparatus, and non-transitory computer-readable medium described above may further include processes, features, means, or instructions for determining the contingency bandwidth part of the carrier based at least in part on the mapping.

Some examples of the method, apparatus, and non-transitory computer-readable medium described above may further include processes, features, means, or instructions for receiving an indication of the mapping via RRC signaling.

In some examples of the method, apparatus, and non-transitory computer-readable medium described above, the reference signal may be quasi-colocated with the beam comprising the random access resource.

Some examples of the method, apparatus, and non-transitory computer-readable medium described above may further include processes, features, means, or instructions for identifying a candidate beam based at least in part on the reference signal.

In some examples of the method, apparatus, and non-transitory computer-readable medium described above, the reference signal comprises a synchronization signal, a channel state information reference signal (CSI-RS), or a combination thereof.

In some examples of the method, apparatus, and non-transitory computer-readable medium described above, performing the random access procedure using the contingency bandwidth part of the carrier comprises determining a number of viable candidate beams for the active bandwidth part of the carrier. Some examples of the method, apparatus, and non-transitory computer-readable medium described above may further include processes, features, means, or instructions for selecting the random access procedure based at least in part on the number of viable candidate beams for the active bandwidth part of the carrier.

In some examples of the method, apparatus, and non-transitory computer-readable medium described above, selecting the random access procedure comprises selecting the random access procedure as a contention-free random access procedure if the number of viable candidate beams in the active bandwidth part of the carrier is at least one.

In some examples of the method, apparatus, and non-transitory computer-readable medium described above, selecting the random access procedure comprises selecting the random access procedure as a contention-based random access procedure if the number of viable candidate beams in the active bandwidth part of the carrier is zero.

In some examples of the method, apparatus, and non-transitory computer-readable medium described above, performing the random access procedure using the contingency bandwidth part of the carrier comprises determining a number of viable candidate beams for the contingency bandwidth part of the carrier. Some examples of the method, apparatus, and non-transitory computer-readable medium described above may further include processes, features, means, or instructions for selecting the random access procedure based at least in part on the number of viable candidate beams for the contingency bandwidth part of the carrier.

In some examples of the method, apparatus, and non-transitory computer-readable medium described above, selecting the random access procedure comprises selecting the random access procedure as a contention-free random access procedure if the number of viable candidate beams in the contingency bandwidth part of the carrier is at least one.

In some examples of the method, apparatus, and non-transitory computer-readable medium described above, selecting the random access procedure comprises selecting the random access procedure as a contention-based random access procedure if the number of viable candidate beams in the contingency bandwidth part of the carrier is zero.

In some examples of the method, apparatus, and non-transitory computer-readable medium described above, the contingency bandwidth part of the carrier may be the active bandwidth part of the carrier.

In some examples of the method, apparatus, and non-transitory computer-readable medium described above, the active bandwidth part of the carrier may be a first bandwidth part, and the contingency bandwidth part of the carrier may be a second bandwidth part.

A method of wireless communication is described. The method may include configuring a user equipment (UE) to utilize a first bandwidth part of a carrier as an active bandwidth part of the carrier for wireless communication and transmitting, to the UE, an indication of a contingency bandwidth part of the carrier to use for a subsequent random access procedure.

An apparatus for wireless communication is described. The apparatus may include means for configuring a user equipment (UE) to utilize a first bandwidth part of a carrier as an active bandwidth part of the carrier for wireless communication and means for transmitting, to the UE, an indication of a contingency bandwidth part of the carrier to use for a subsequent random access procedure.

Another apparatus for wireless communication is described. The apparatus may include a processor, memory in electronic communication with the processor, and instructions stored in the memory. The instructions may be operable to cause the processor to configure a user equipment (UE) to utilize a first bandwidth part of a carrier as an active bandwidth part of the carrier for wireless communication and transmit, to the UE, an indication of a contingency bandwidth part of the carrier to use for a subsequent random access procedure.

A non-transitory computer-readable medium for wireless communication is described. The non-transitory computer-readable medium may include instructions operable to cause a processor to configure a user equipment (UE) to utilize a first bandwidth part of a carrier as an active bandwidth part of the carrier for wireless communication and transmit, to the UE, an indication of a contingency bandwidth part of the carrier to use for a subsequent random access procedure.

In some examples of the method, apparatus, and non-transitory computer-readable medium described above, transmitting the indication of the contingency bandwidth part of the carrier comprises transmitting, to the UE, a reference signal in the active bandwidth part of the carrier. Some examples of the method, apparatus, and non-transitory computer-readable medium described above may further include processes, features, means, or instructions for transmitting, to the UE, a beam comprising a random access resource. Some examples of the method, apparatus, and non-transitory computer-readable medium described above may further include processes, features, means, or instructions for transmitting, to the UE, an indication of a mapping between the reference signal and the beam comprising the random access resource.

In some examples of the method, apparatus, and non-transitory computer-readable medium described above, transmitting the indication of the mapping comprises transmitting the indication of the mapping via RRC signaling.

In some examples of the method, apparatus, and non-transitory computer-readable medium described above, transmitting the indication of the contingency bandwidth part of the carrier comprises transmitting an explicit indication of the contingency bandwidth part of the carrier via RRC signaling.

In some examples of the method, apparatus, and non-transitory computer-readable medium described above, transmitting the indication of the contingency bandwidth part of the carrier comprises configuring the UE to determine the contingency bandwidth part of the carrier based at least in part on a prior random access procedure by the UE.

In some examples of the method, apparatus, and non-transitory computer-readable medium described above, the contingency bandwidth part of the carrier may be the active bandwidth part of the carrier.

In some examples of the method, apparatus, and non-transitory computer-readable medium described above, the contingency bandwidth part of the carrier may be a second bandwidth part.

DETAILED DESCRIPTION

Figure 1:
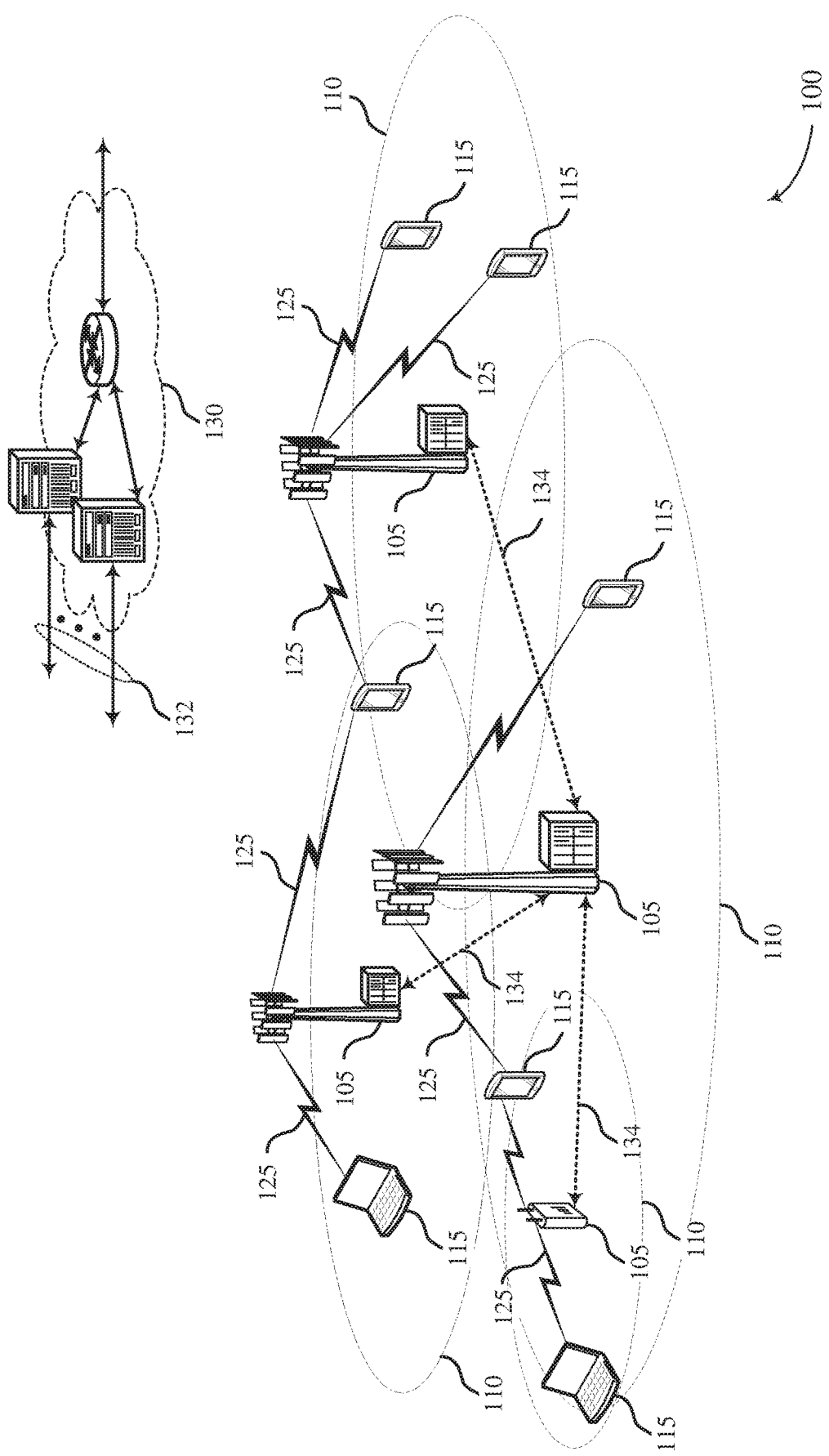
FIG. 1 illustrates an example of a system for wireless communication that supports beam recovery in a multiple bandwidth part environment in accordance with aspects of the present disclosure.

Devices in a wireless communications system, such as base stations and UEs, may communicate using one or more carriers. The term "carrier" may refer to a set of radio frequency spectrum resources having a defined physical layer structure for supporting communications over a communication link. Each carrier may have a corresponding bandwidth (e.g., 400 MHz), and in some cases, different carriers may have different bandwidths. A carrier may be subdivided into portions, each portion having a smaller bandwidth than the carrier bandwidth (e.g., 100 MHz), and such portions may be referred to as bandwidth parts. For example, some devices (e.g., some UEs) may not support the full bandwidth of a carrier, and thus may communicate using one or more bandwidth parts. In some cases, a UE may establish communications with a base station using a first bandwidth part, which may be referred to as an initial bandwidth part, and the UE may thereafter switch to a different bandwidth part. A bandwidth part in use by a UE for wireless communication may be referred to as an active bandwidth part. In some cases, only some bandwidth parts within a carrier may support random access by UEs. Thus, in some cases, an active bandwidth part may not support random access.

Some wireless devices may also employ beamforming. Beamforming is a signal processing technique that may be used at a transmitting device or a receiving device (e.g., a base station or a UE) to shape or steer an antenna beam (e.g., a transmit beam or receive beam) along a spatial path between the transmitting device and the receiving device. Thus, some wireless devices may communicate with one another via one or more beams. A beam in use by a UE for wireless communication may be referred to as a serving beam.

A serving beam may occasionally fail (e.g., due to deteriorated channel conditions for the serving beam). If a UE is using an active bandwidth part that does not support random access, and a serving beam failure occurs, a base station may be unable to configure the UE to use a different bandwidth part that does support random access. Additionally, the beams that are viable for wireless communications (e.g., that support error rates below a threshold) in one bandwidth part may not be viable in another bandwidth part. For example, because different bandwidth parts may span different frequency ranges, channel conditions for a given beam (e.g., a beam in a given beam direction) may differ across bandwidth parts. These and other issues may complicate beam recovery and the re-establishment of communications in the event of serving beam failure in a multiple bandwidth part environment.

As described herein, wireless devices, such as base stations and UEs, may support techniques for beam recovery in a multiple bandwidth part environment. Thus, the techniques herein may, among other benefits, improve the reliability of wireless communications, including beamformed communications, in a multiple bandwidth part environment and enhance the ability of a UE to establish wireless communications (e.g., with a base station). A UE may identify a serving beam failure in an active bandwidth part, may determine a level of support provided by the active bandwidth part for a random access procedure, and may determine a contingency (e.g. fallback) bandwidth part that supports the random access procedure. In some cases, the UE may identify the contingency bandwidth part based on a prior random access procedure (e.g., the contingency bandwidth part may be one the UE used previously to establish communications). In some cases, a base station may send to the UE, prior to the serving beam failure, an explicit indication of the contingency bandwidth part. In some cases, the UE may identify the contingency bandwidth part based on a reference signal—e.g., a base station may transmit a reference signal and may also transmit to the UE an indication of a relationship (e.g., quasi-colocation) between the reference signal and a beam that the UE may use for random access. Upon determining the contingency bandwidth part, the UE may perform the random access procedure using the contingency bandwidth part.

These and other aspects of the disclosure are initially described in the context of a wireless communications system. Aspects of the disclosure are further illustrated by and described with reference to process flows, apparatus diagrams, system diagrams, and flowcharts that relate to beam recovery in a multiple bandwidth part environment.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

As introduced above, beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be colocated at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

As introduced above, the term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology.

Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, 80, 400 MHz, etc.).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, each served UE 115 may be configured for operating over portions or all of a carrier bandwidth. As introduced above, a portion of the carrier bandwidth may be referred to as a bandwidth part, and a bandwidth part actively used by a UE for wireless communication at a given point in time may be referred to as an active bandwidth part. Base stations 105 and UEs 115 may support the techniques described herein for beam recovery, which may include establishing communications via a random access procedure subsequent to a serving beam failure in an active bandwidth part.

Figure 2:
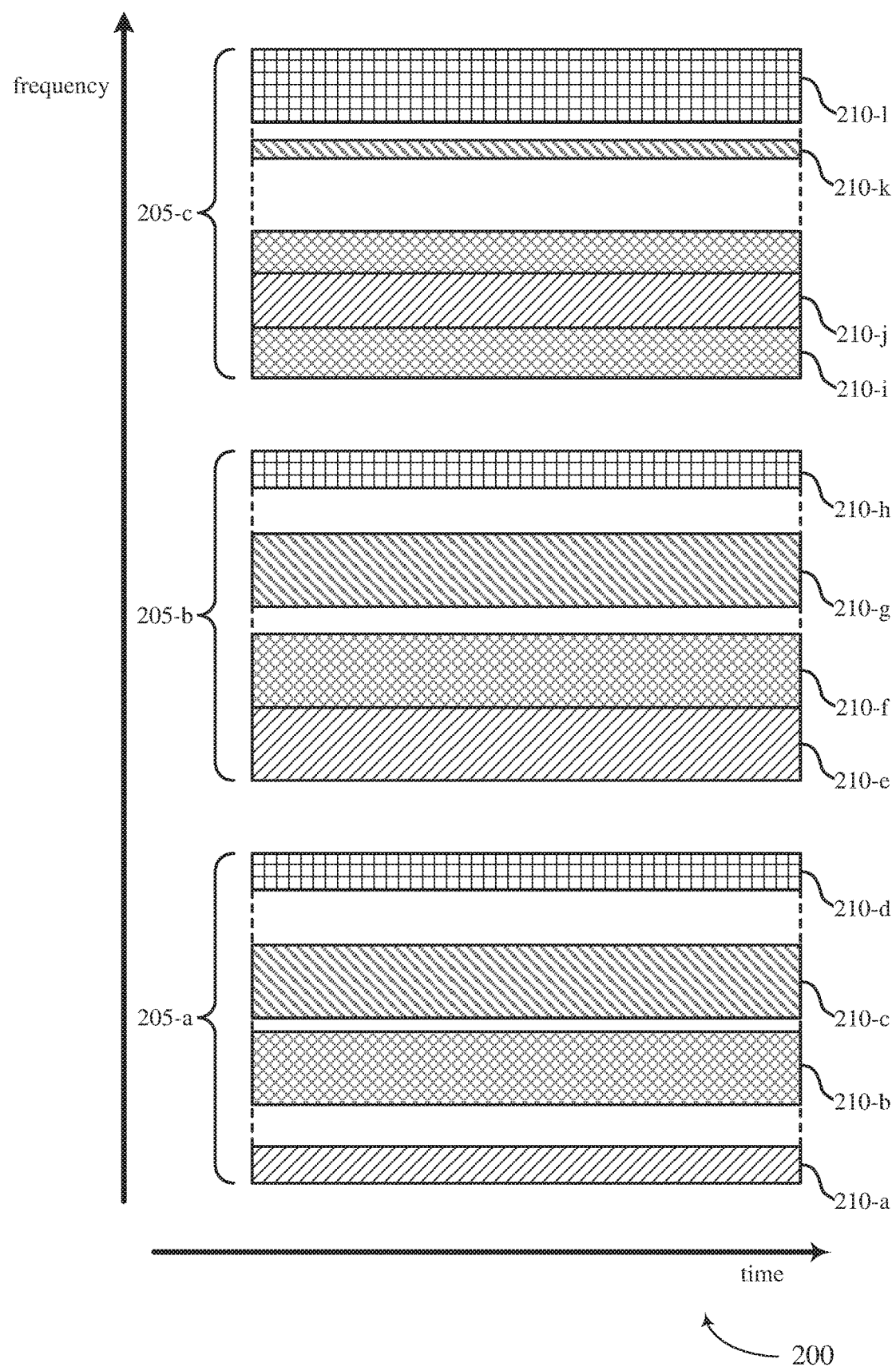
FIG. 2 illustrates an example of a carrier configuration that supports beam recovery in a multiple bandwidth part environment in accordance with aspects of the present disclosure.

FIG. 2 illustrates an example of a carrier configuration 200 that includes a multiple bandwidth part environment in accordance with various aspects of the present disclosure. In some examples, carrier configuration 200 may be implemented by aspects of wireless communication system 100. For example, a base station 105 may implement carrier configuration 200.

Carrier configuration 200 includes a plurality of carriers 205, each comprising a plurality of bandwidth parts 210. A carrier 205 may have a relatively large bandwidth (e.g., 400 MHz), and a bandwidth part 210 may have a relatively small bandwidth (e.g., 100 MHz). Carrier 205-*a* comprises bandwidth part 210-*a*, bandwidth part 210-*b*, bandwidth part 210-*c*, and bandwidth part 210-*d*. Carrier 205-*b* comprises bandwidth part 210-*e*, bandwidth part 210-*f*, bandwidth part 210-*g*, and bandwidth part 210-*h*. Carrier 205-*c* comprises bandwidth part 210-*i*, bandwidth part 210-*j*, bandwidth part 210-*k*, and bandwidth part 210-*l*.

Though the example of carrier configuration 200 includes three carriers 205, each including four bandwidth parts 210, it is to be understand that a wireless communications system 100 may support any number of carriers 205 and any number of bandwidth parts 210, including any number of bandwidth parts 210 per carrier 205, and that the number of bandwidth parts 210 per carrier 205 may vary across carriers 205. Further, though each carrier 205 in the example of carrier configuration 200 has the same carrier bandwidth, it is to be understood that different carriers 205 may have different bandwidths. Different bandwidth parts 210 likewise may have different bandwidths.

Bandwidth parts 210 may be separated in frequency by a buffer frequency range (e.g., bandwidth part 210-*a* and bandwidth part 210-*b* within carrier 205-*a*) or may be adjacent in frequency (e.g., bandwidth part 210-*e* and bandwidth part 210-*f* within carrier 205-*b*). In some cases, bandwidth parts 210 may overlap in frequency (e.g., bandwidth part 210-*j* and bandwidth part 210-*i* within carrier 205-*c*). Bandwidth parts 210 that overlap in frequency may be referred to as overlapping, and bandwidth parts 210 that do not overlap in frequency may be referred to as orthogonal.

Some UEs 115 may not support the entire bandwidth of a carrier 205 (e.g., due to cost, complexity, or power constraints of the UE 115). Thus, a base station 105 may configure a UE 115 to use one or more bandwidth parts 210, each having bandwidths that are supported by the UE 115. For example, a base station 105 may configure a UE 115 to use one or more bandwidth parts 210 via RRC signaling (e.g., using an RRC protocol).

In some cases, a UE 115 may simultaneously have one active bandwidth part 210 configured for downlink communications and another active bandwidth part 210 configured for uplink communications. Some base stations 105 may limit a UE 115 to at most one active bandwidth part 210 configured for downlink communications at a time and at most one active bandwidth part 210 for uplink communications at a time.

For each configured bandwidth part 210, the base station 105 may configure the bandwidth of the bandwidth part 210, the frequency (e.g., frequency bounds) of the bandwidth part 210, and the numerology of the bandwidth part 210. The numerology of a bandwidth part 210 may include the subcarrier spacing and symbol duration of the bandwidth part. In some cases, a wireless communications system 100 may support multiple numerologies, and the base station 105 may determine and configure the numerology of each configured bandwidth part 210. In some cases, numerologies may scale relative to a base numerology by powers of two (2), and the base station 105 may indicate the numerology of a bandwidth part 210 to a UE 115 by transmitting to the UE 115 an indication of a parameter representing the power of two (2)—e.g., a given numerology may have a subcarrier spacing that is equal to a base subcarrier spacing multiplied by $2^\mu$, and the base station may indicate the numerology to a UE 115 by transmitting to the UE 115 an indication of $\mu$.

Figure 3:
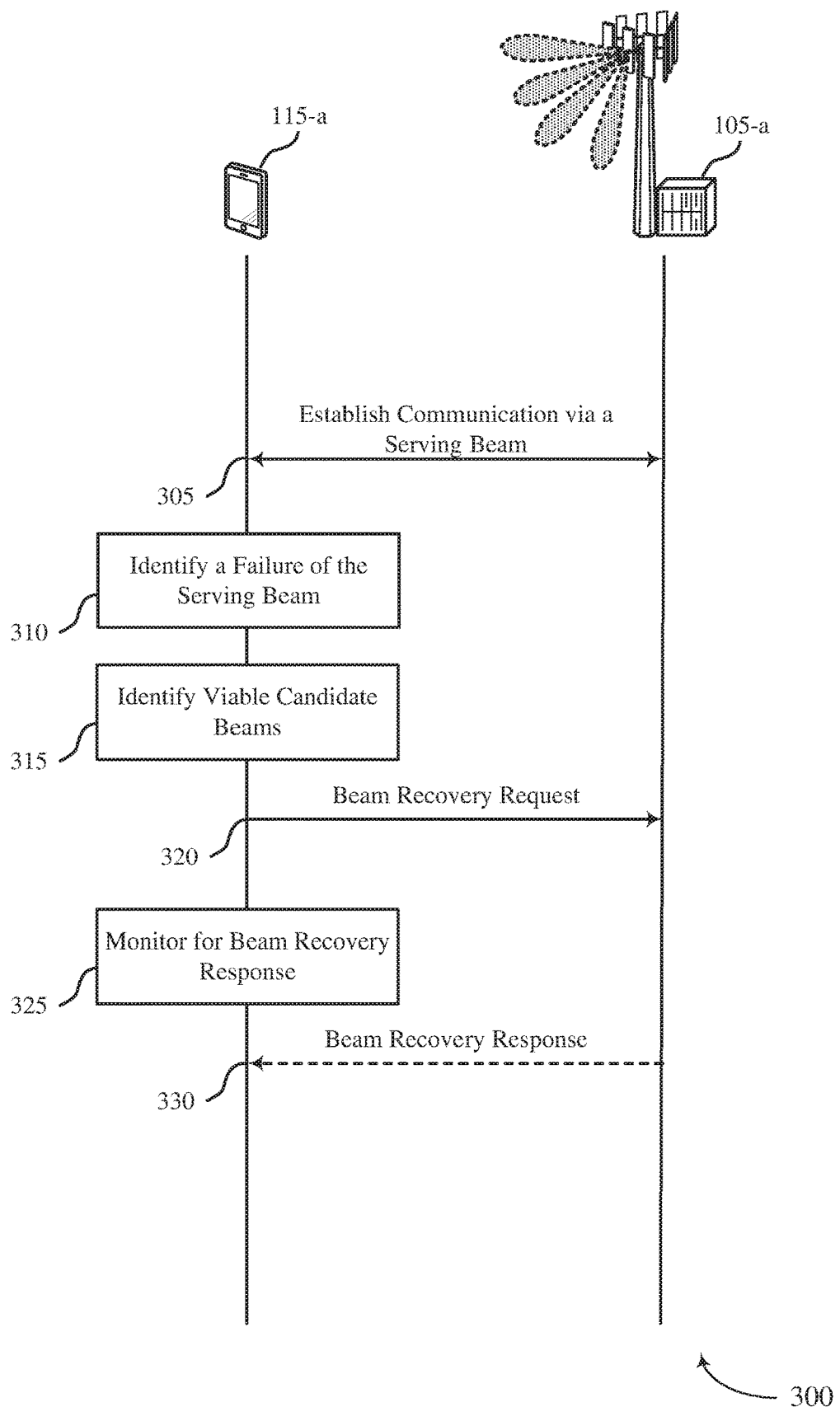
FIGS. 3 through 6 illustrate examples of processes that support beam recovery in a multiple bandwidth part environment in accordance with aspects of the present disclosure.

FIG. 3 illustrates an example of a process 300 that supports beam recovery in a multiple bandwidth part environment in accordance with various aspects of the present disclosure. In some examples, process 300 may be implemented by aspects of wireless communication system 100. For example, process 300 may be implemented by a base station 105-*a* and UE 115-*a*, which may be examples of a base station 105 and a UE 115 as described with reference to FIG. 1.

At 305, the UE 115-*a* and the base station 105-*a* may exchange one or more message to establish wireless communication with one another via a serving beam. For example, the UE 115-*a* may have previously been in an RRC idle state, and at 305, the UE 115-*a* and the base station 105-*a* may execute a random access procedure. As another example, the UE 115-*a* may have previously been in an RRC connected state, and at 305, the UE 115-*a* and the base station 105-*a* may execute a beam selection procedure (e.g., based on signal quality associated with one or more candidate beams) in order to establish communication via the serving beam.

At 310, the UE 115-*a* may identify (e.g., detect) a failure of the serving beam. In some cases, the UE 115-*a* may detect a failure of the serving beam based on an error rate associated with the serving beam. For example, the UE 115-*a* may determine the error rate associated with the serving beam, may compare the error rate to a threshold, and may identify a failure of the serving beam if the error rate meets or exceeds the threshold. The error rate may be a block error ratio (BLER), and the UE 115-*a* may determine the BLER for a physical downlink control channel (PDCCH) carried by the serving beam. The UE 115-*a* may identify the failure of the serving beam at the PHY layer, and the PHY layer may send an indication of the failure of the serving beam to the MAC layer.

At 315, the UE 115-*a* may identify one or more viable candidate beams. A candidate beam may be a beam transmitted by the base station 105-*a*, and a candidate beam may be viable if it is capable of supporting wireless communications between the UE 115-*a* and the base station 105-*a*. The UE 115-*a* may identify one or more viable candidate beams by identifying one or more candidate beams transmitted by the base station 105-*a* and, for each identified candidate beam, determining its viability (e.g., a level of viability of the candidate beam, or whether the candidate beam is viable). When the UE 115-*a* identifies more than one viable candidate beam at 315, the UE 115-*a* may select one of the viable beams (e.g., may select the candidate beam having the highest RSRP).

In some cases, the UE 115-*a* may determine the viability of a candidate beam based on a reference signal carried by the candidate beam. For example, the UE 115-*a* may determine (e.g., measure) a reference signal received power (RSRP) for the reference signal and compare the RSRP to a threshold. The UE 115-*a* may determine that the candidate beam is viable if the RSRP exceeds the threshold; otherwise, the UE 115-*a* may determine that the candidate beam is not viable. In some cases, the UE 115-*a* may measure the RSRP of the reference signal at the PHY layer, which may also be referred to as layer 1 (L1), and thus the measured RSRP used to determine the viability of the candidate beam may be an L1 RSRP. Further, in some cases, the UE 115-*a* may use an L1 filter, and thus the measured RSRP used to determine the viability of the candidate beam may be a filtered L1 RSRP.

The reference signal based upon which the UE 115-*a* determines the viability of a reference beam may be a synchronization-related reference signal or a channel state information reference signal (CSI-RS), or a combination thereof (e.g., the viability determination may be based on both a synchronization-related reference signal and a CSI-RS). In some cases, the synchronization-related reference signal may be included in a synchronization signal (SS) block (SSB), which may be beamswept by the base station 105-*a* (e.g., repeatedly transmitted in different directions (e.g., via different beams) according to a schedule, such as a periodic schedule). An SSB may include a primary synchronization signal (PSS) or a secondary synchronization signal (SSS), and a series of SSBs beamswept as a group may be referred to as an SS burst.

At 320, the UE 115-*a* may transmit a beam recovery request to the base station 105-*a* via the selected candidate beam. The beam recovery request may include information regarding the selected candidate beam, which may be used by the base station 105-*a* to determine whether to re-establish wireless communications with the UE 115-*a* via the selected candidate beam. When the selected candidate beam includes a dedicated random access resource (e.g., a physical random access channel (PRACH), the UE 115-*a* may initiate a contention free random access (CFRA) procedure. For example, the UE 115-*a* may transmit the beam recovery request using the dedicated random access resource. In some cases, the UE 115-*a* may use CFRA only if the selected candidate beam also has a quality metric (e.g., RSRP) above a threshold, which may be the same threshold used to determine the viability of the candidate beam, or a different threshold specific to determining whether to use CFRA. When the selected candidate beam does not include a dedicated random access resource (or, in some cases, if the quality metric for the candidate beam is below the threshold), the UE 115-*a* may initiate a contention-based random access procedure (CBRA).

At the 325, the UE 115-*a* may monitor for a beam recovery response from the base station 105-*a*. In some cases, the UE 115-*a* may monitor for the beam recovery response by monitoring a PDCCH addressed to a radio network temporary identifier (RNTI), which may be a cell RNTI (C-RNTI), associated with the UE 115-*a*. Further, in some cases, the UE 115-*a* may monitor for the beam recovery response within a time duration subsequent to the beam recovery request—the time duration may be configured for the UE 115-*a* by the base station 105-*a* via RRC signaling.

In some cases, at 330, the base station 105-*a* may transmit and the UE 115-*a* may receive a beam recovery response. The beam recovery response may indicate whether the UE 115-*a* may use the selected candidate beam associated with the beam recovery request for subsequent wireless communications with the base station 105-*a*. In some cases, the beam recovery response may include a random access response. If, following a beam recovery request, the UE 115-*a* does not receive a beam recovery response (e.g., does not receive a beam recovery response within the relevant time duration), the UE 115-*a* may proceed as though the beam recovery request has been denied, and may transmit another beam recovery request.

A beam recovery such as process 300 may include fewer operations and thus provide efficiency and latency benefits relative to radio link failure (RLF) procedures.

Figure 4:
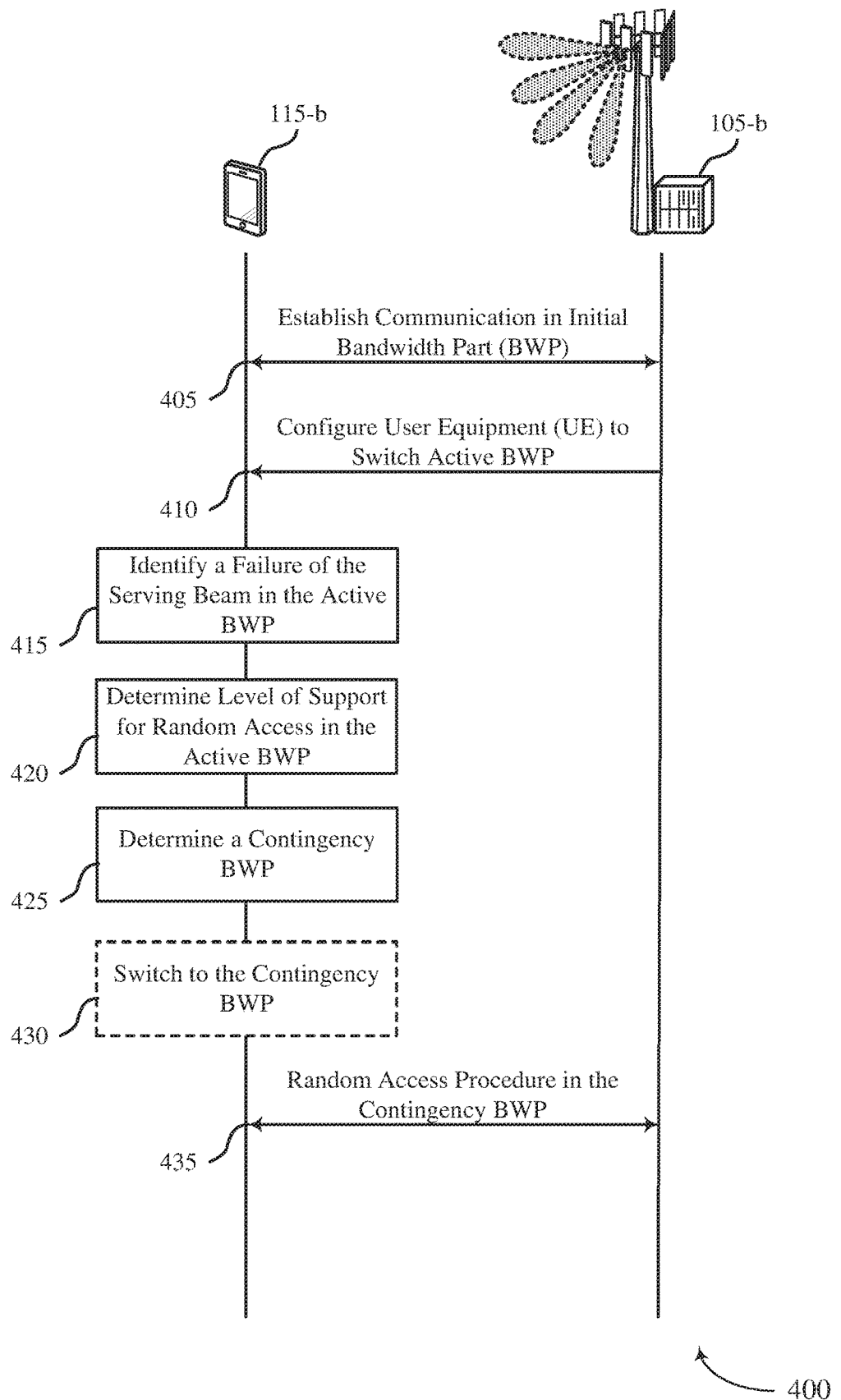

FIG. 4 illustrates an example of a process 400 that supports beam recovery in a multiple bandwidth part environment in accordance with various aspects of the present disclosure. In some examples, process 400 may be implemented by aspects of wireless communication system 100. For example, process 400 may be implemented by a base station 105-*b* and UE 115-*b*, which may be examples of a base station 105 and a UE 115 as described with reference to FIG. 1.

At 405, the UE 115-*b* and the base station 105-*b* may exchange one or more messages to establish wireless communication in an initial bandwidth part. For example, the UE 115-*a* may have previously been in an RRC idle state, and at 305, the UE 115-*b* and the base station 105-*b* may execute a random access procedure. The initial bandwidth part may include a random access resource (e.g., a PRACH), and the UE 115-*b* may use the random access resource in the initial bandwidth part to establish wireless communication in an initial bandwidth part.

In some cases, base station 105-*b* may configure the UE 115-*b* to use the initial bandwidth part. For example, the base station 105-*b* may transmit in the initial bandwidth part an SSB encoded with an identifier of the UE 115-*b* (e.g., a random mobile subscriber identity (RMSI) or RNTI). The UE 115-*b* may search (e.g., monitor) for an SSB encoded with an identifier of the UE 115-*b* and, upon identifying the SSB encoded with the identifier of the UE 115-*b*, may determine that the bandwidth part via which the SSB is transmitted is the initial bandwidth part that the UE 115-*b* is to use to establish wireless communications with the base station 105-*b*. When the UE 115-*b* and base station 105-*b* use beamforming, the UE 115-*b* and base station 105-*b* may also at 405 establish communications using an initial serving beam (e.g., as described in reference to process 300).

At 410, the base station 105-*b* may configure the UE 115-*b* to switch to a different bandwidth part (different from the initial bandwidth part) to use as an active bandwidth part for wireless communications with the base station 105-*b*. The active bandwidth part configured at 410 may be an uplink or a downlink bandwidth part. In some cases, the base station 105-*b* may configure the UE 115-*b* to switch to the active bandwidth part via one or more downlink control information (DCI) messages. In some cases, the base station 105-*b* may configure the UE 115-*b* to switch to the active bandwidth part via RRC signaling. The UE 115-*b* and base station 105-*b* may also at 410 establish communications using a new serving beam in the active bandwidth part, or may continue to use the serving beam used in the initial bandwidth part (e.g., the frequency of the serving beam may change while other beam parameters (e.g., beam direction) remain unchanged). Though the example of process 400 shows only one bandwidth part switch, it is to be understood that any number of bandwidth part switches may occur.

At 415, the UE 115-*b* may identify a failure of the serving beam in the active bandwidth part. The UE 115-*b* may identify the failure of the serving beam as described in reference to process 300.

At 420, the UE 115-*b* may determine, for the active bandwidth part, a level of support for a random access procedure. For example, the UE 115-*b* may determine whether the active bandwidth part does or does not support random access. In some cases, the UE 115-*b* may determine the level of support for the random access procedure based on whether the active bandwidth part includes a random access resource (e.g., a PRACH).

At 425, the UE 115-*b* may determine, based on (e.g., in response to) having identified at 415 the failure of the serving beam in the active bandwidth part and/or having determined at 420 the level of support for the random access procedure, a contingency bandwidth part. The contingency (e.g., fallback) bandwidth part may be a bandwidth part that supports the random access procedure and that UE 115-*b* is to use to re-establish wireless communications with the base station 105-*b*.

If the level of support determined at 420 is sufficient (e.g., if the active bandwidth part supports random access), the UE 115-*b* may determine that the contingency bandwidth part is the active bandwidth part. If the level of support determined at 420 is insufficient (e.g., if the active bandwidth part does not support random access), the UE 115-*b* may determine that the contingency bandwidth part is the initial bandwidth part. Thus, the UE 115-*b* may in some cases determine the contingency bandwidth part based on a prior random access procedure by the UE 115-*b*. For example, the UE 115-*b* may at 405 store information regarding the initial bandwidth part, and thus may know that the initial bandwidth part sufficiently supports random access.

At 430, if the contingency bandwidth part determined at 425 is different than the active bandwidth part, the UE 115-*b* may switch to utilize the contingency bandwidth part determined at 425. Switching to the contingency bandwidth part may include configuring a transmitter or receiver included in the UE 115-*b* to use the contingency bandwidth part.

At 435, the UE 115-*b* and the base station 105-*b* may perform a random access procedure using the contingency bandwidth part determined at 425. For example, the UE 115-*b* may transmit to the base station 105-*b* a beam recovery request (e.g., a beam recovery request as described in reference to process 300).

In some cases, the UE 115-*b* may determine the random access procedure performed at 435 based on a number of viable candidate beams included in the active bandwidth part. For example, the UE 115-*b* may determine a number of viable candidate beams included in the active bandwidth part (e.g., by identifying viable candidate beams as described in reference to process 300, which may occur subsequent to or prior to the identification of the failure of the serving beam at 310), and may select a CFRA procedure if the number of viable candidate beams included in the active bandwidth part meets or exceeds threshold, and may select a CBRA procedure if the number of viable candidate beams included in the active bandwidth part is below a threshold. In some cases, the threshold may be one, and the UE 115-*b* may select a CFRA procedure if the active bandwidth part includes at least one viable candidate beam, and the UE 115-*b* may select a CBRA procedure if the active bandwidth part includes no viable candidate beam. In some cases, the UE 115-*b* may determine the random access procedure performed at 435 prior to determining, for the active bandwidth part, the level of support for random access at 420, but it is to be understood that the UE 115-*b* may determine the random access procedure performed at 435 at any time.

In some cases, the UE 115-*b* may determine the random access procedure performed at 435 based on a number of viable candidate beams included in the contingency bandwidth part. For example, the UE 115-*b* may determine a number of viable candidate beams included in the contingency bandwidth part (e.g., by identifying viable candidate beams as described in reference to process 300, which may occur subsequent to or prior to the identification of the failure of the serving beam at 310), and may select a CFRA procedure if the number of viable candidate beams included in the contingency bandwidth part meets or exceeds threshold, and may select a CBRA procedure if the number of viable candidate beams included in the contingency bandwidth part is below a threshold. In some cases, the threshold may be one, and the UE 115-*b* may select a CFRA procedure if the contingency bandwidth part includes at least one viable candidate beam, and the UE 115-*b* may select a CBRA procedure if the contingency bandwidth part includes no viable candidate beam. In some cases, the UE 115-*b* may determine the random access procedure performed at 435 subsequent to determining the contingency bandwidth part at 425, but it is to be understood that the UE 115-*b* may determine the random access procedure performed at 435 at any time.

Though process 400 utilizes a single contingency bandwidth part, it is to be understood that process 400 may be modified to utilize any number of contingency bandwidth parts. For example, at 425, the UE 115-*b* may determine a pair of contingency bandwidth parts, one for uplink and one for downlink, with the UE 115-*b* using one of the determined contingency bandwidth parts for uplink aspects of the random access procedure performed at 435 and the other of the determined contingency bandwidth parts for downlink aspects of the random access procedure performed at 435. For example, the UE 115-*b* may determine the pair of contingency bandwidth parts as the active uplink bandwidth part and active downlink bandwidth part, or may determine the pair of contingency bandwidth parts as the initial uplink bandwidth part and initial downlink bandwidth part.

Figure 5:
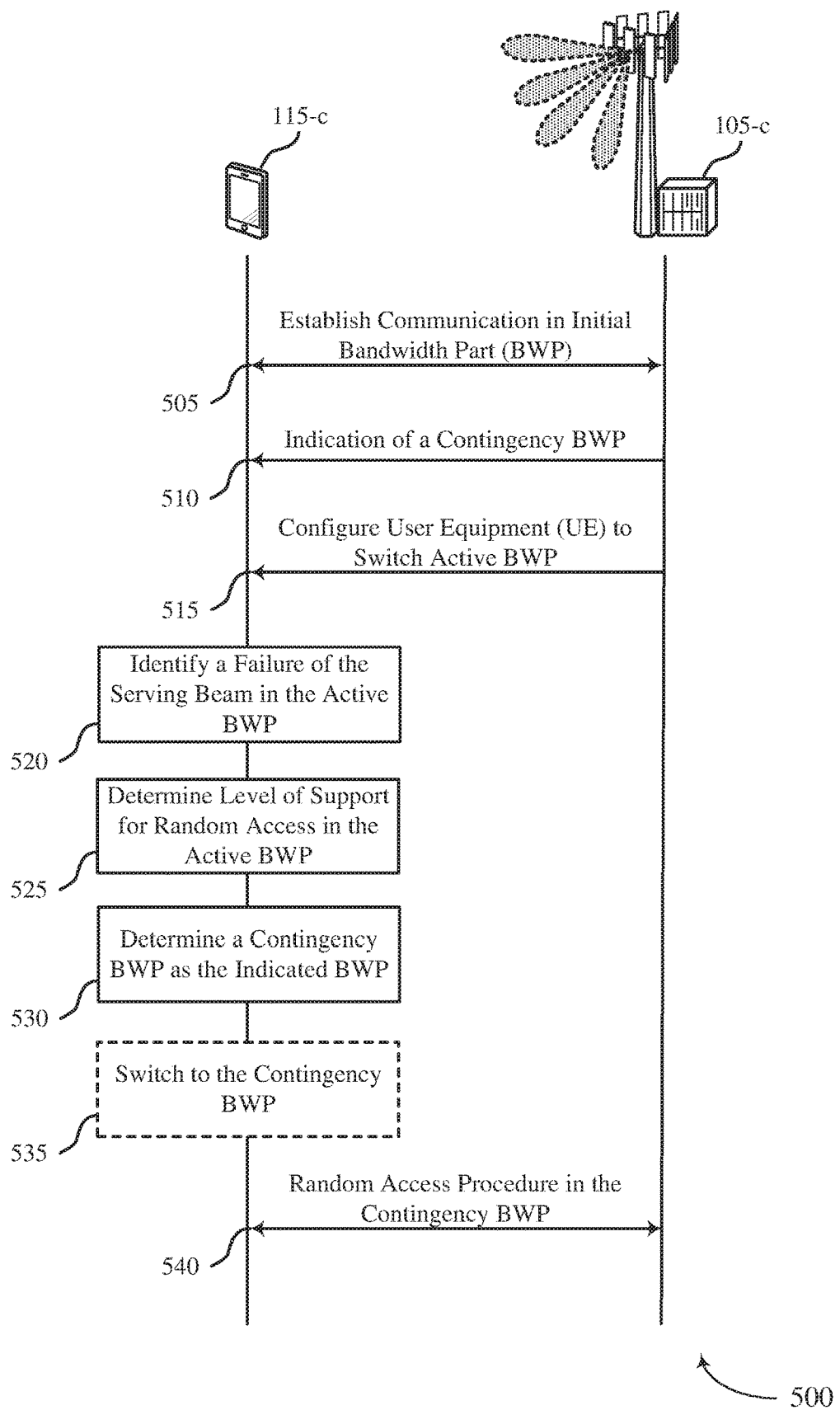

FIG. 5 illustrates an example of a process 500 that supports beam recovery in a multiple bandwidth part environment in accordance with various aspects of the present disclosure. In some examples, process 500 may be implemented by aspects of wireless communication system 100. For example, process 500 may be implemented by a base station 105-*c* and UE 115-*c*, which may be examples of a base station 105 and a UE 115 as described with reference to FIG. 1.

At 505, the UE 115-*c* and the base station 105-*c* may exchange one or more messages to establish wireless communication in an initial bandwidth part (e.g., as described in reference to aspect 405 of process 400).

At 510, the base station 105-*c* may transmit to the UE 115-*c* an indication (e.g., an explicit indication) of a contingency bandwidth part that the UE 115-*c* is to use for beam recovery and random access in the event of a subsequent serving beam failure. The indicated contingency bandwidth part may be the initial bandwidth part, a default (e.g., dedicated) bandwidth part configured by the base station 105-*c* for random access, or any other bandwidth part that supports random access (e.g., that includes a random access resource, such as a PRACH). It is to be understood that the indication of the contingency bandwidth part transmitted at 510 may be transmitted by the base station 105-*c* at any time, including as part of the messages exchanged at 505. In some cases, the base station 105-*c* may at 510 transmit the indication via RRC signaling. Identifying, by the base station 105-*c*, the contingency bandwidth part that the UE 115-*c* is to use for beam recovery and random access in the event of a subsequent serving beam failure may beneficially avoid overloading a random access resource included in any one bandwidth part, as the base station 105-*c* may control how many UEs 115 are allocated to a given contingency bandwidth part.

At 515, the base station 105-*c* may configure the UE 115-*c* to switch to a different bandwidth part (different from the initial bandwidth part) to use as an active bandwidth part for wireless communications with the base station 105-*c* (e.g., as described in reference to aspect 410 of process 400).

At 520, the UE 115-*c* may identify a failure of the serving beam in the active bandwidth part (e.g., as described in reference to aspect 415 of process 400).

At 525, the UE 115-*c* may determine, for the active bandwidth part, a level of support for a random access procedure (e.g., as described in reference to aspect 420 of process 400).

At 530, the UE 115-*c* may determine, based on (e.g., in response to) having identified at 520 the failure of the serving beam in the active bandwidth part and/or having determined at 525 the level of support for the random access procedure, a contingency bandwidth part based on the indication received at 510. For example, the UE 115-*c* may determine the contingency bandwidth part as the bandwidth part indicated at 510.

At 535, if the contingency bandwidth part determined at 530 is different than the active bandwidth part, the UE 115-*c* may switch to utilize the contingency bandwidth part determined at 530. Switching to the contingency bandwidth part may include configuring a transmitter or receiver included in the UE 115-*c* to use the contingency bandwidth part.

At 540, the UE 115-*c* and the base station 105-*c* may perform a random access procedure using the contingency bandwidth part determined at 530. For example, the UE 115-*c* may transmit to the base station 105-*c* a beam recovery request (e.g., a beam recovery request as described in reference to process 300).

In some cases, the UE 115-*c* may determine the random access procedure performed at 540 based on a number of viable candidate beams included in the active bandwidth part. For example, the UE 115-*c* may determine a number of viable candidate beams included in the active bandwidth part (e.g., by identifying viable candidate beams as described in reference to process 300, which may occur subsequent to or prior to the identification of the failure of the serving beam at 520), and may select a CFRA procedure if the number of viable candidate beams included in the active bandwidth part meets or exceeds threshold, and may select a CBRA procedure if the number of viable candidate beams included in the active bandwidth part is below a threshold. In some cases, the threshold may be one, and the UE 115-*c* may select a CFRA procedure if the active bandwidth part includes at least one viable candidate beam, and the UE 115-*c* may select a CBRA procedure if the active bandwidth part includes no viable candidate beam. In some cases, the UE 115-*c* may determine the random access procedure performed at 540 prior to determining, for the active bandwidth part, the level of support for random access at 525, but it is to be understood that the UE 115-*c* may determine the random access procedure performed at 540 at any time.

In some cases, the UE 115-*c* may determine the random access procedure performed at 540 based on a number of viable candidate beams included in the contingency bandwidth part. For example, the UE 115-*c* may determine a number of viable candidate beams included in the contingency bandwidth part (e.g., by identifying viable candidate beams as described in reference to process 300, which may occur subsequent to or prior to the identification of the failure of the serving beam at 310), and may select a CFRA procedure if the number of viable candidate beams included in the contingency bandwidth part meets or exceeds threshold, and may select a CBRA procedure if the number of viable candidate beams included in the contingency bandwidth part is below a threshold. In some cases, the threshold may be one, and the UE 115-*c* may select a CFRA procedure if the contingency bandwidth part includes at least one viable candidate beam, and the UE 115-*c* may select a CBRA procedure if the contingency bandwidth part includes no viable candidate beam. In some cases, the UE 115-*c* may determine the random access procedure performed at 540 subsequent to determining the contingency bandwidth part at 530, but it is to be understood that the UE 115-c may determine the random access procedure performed at 540 at any time.

Though process 500 utilizes a single contingency bandwidth, it is to be understood that process 500 may be modified to utilize any number of contingency bandwidths. For example, at 510, the indication may indicate a pair of contingency bandwidths, one for uplink and one for downlink, with the UE 115-c to use one of the indicated contingency bandwidths for uplink aspects of the random access procedure performed at 540 and the other of the indicated contingency bandwidths for downlink aspects of the random access procedure performed at 540.

Figure 6:
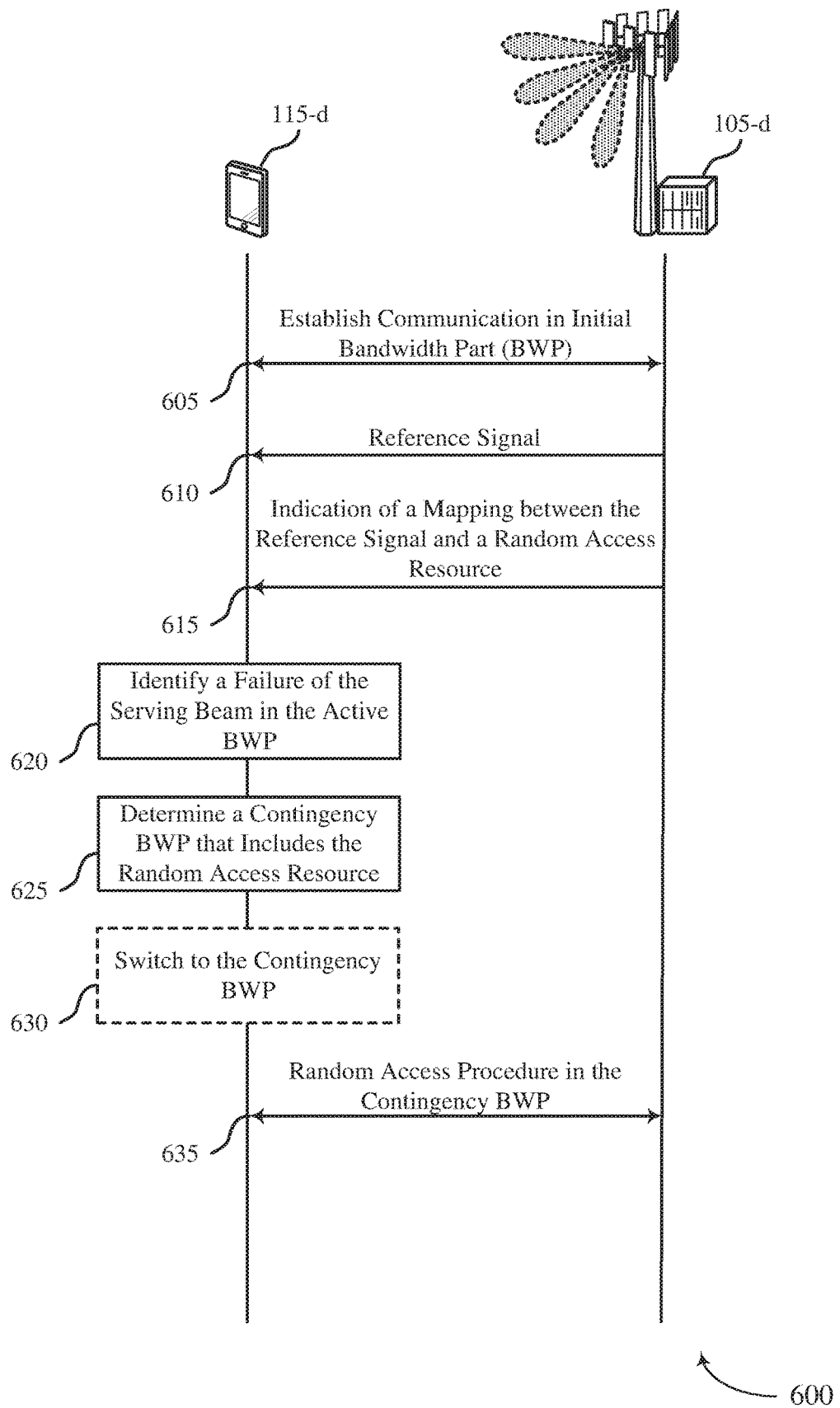

FIG. 6 illustrates an example of a process 600 that supports beam recovery in a multiple bandwidth part environment in accordance with various aspects of the present disclosure. In some examples, process 600 may be implemented by aspects of wireless communication system 100. For example, process 600 may be implemented by a base station 105-d and UE 115-d, which may be examples of a base station 105 and a UE 115 as described with reference to FIG. 1.

At 605, the UE 115-d and the base station 105-d may exchange one or more messages to establish wireless communication in an initial bandwidth part (e.g., as described in reference to aspect 405 of process 400).

At 610, the base station 105-d may transmit and the UE 115-d may receive a reference signal. The reference signal transmitted at 610 may in some cases be the same reference signal used by the UE 115 to identify viable candidate beams, as described in reference to process 300. Thus, the reference signal transmitted at 610 may be included in an SSB, may include a CSI-RS, or may be combination thereof. Though illustrated in FIG. 6 as being transmitted by the base station 105-d only once, it is to be understood that the base station 105-d may transmit the reference signal transmitted at 610 any number of times. For example, the base station 105-d may transmit the reference signal transmitted at 610 according to a schedule (e.g., a periodic schedule) throughout the timeframe of process 600. Further, the base station 105-d may transmit the reference signal transmitted at 610 in any bandwidth part, including the initial bandwidth part or a different bandwidth part that the base station 105-d may configure the UE 115-d to use as an active bandwidth part. In some cases, the base station 105-d may transmit the reference signal transmitted at 610 in all active bandwidth parts supported by the base station 105-d at a given time.

At 615, the base station 105-d may transmit to the UE 115-d an indication of a mapping between the reference signal transmitted at 610 and a random access resource (e.g., a beam carrying a PRACH). The random access resource may be in a same or different bandwidth part than the bandwidth part in which the base station 105-d transmits the reference signal at 610. Further, the base station 105-d may transmit the indication of the mapping before or after transmitting the reference signal at 610. In some cases, the base station 105-d may transmit the indication at 615 using RRC signaling. In some cases, the reference signal transmitted at 610 may be quasi-colocated with the random access resource indicated at 615, and the indication transmitted at 615 may indicate the quasi-colocation.

At 620, the UE 115-d may identify a failure of the serving beam in the active bandwidth part (e.g., as described in reference to aspect 415 of process 400). The active bandwidth part may or may not be the same as the initial bandwidth part, as any number of bandwidth part switches may have occurred between the establishment of communication at 605 and the identification of the failure of the serving beam at 620.

At 625, the UE 115-d may determine, based on (e.g., in response to) having identified at 520 the failure of the serving beam in the active bandwidth part (and/or having determined, for the active bandwidth part, a level of support for a random access procedure as described herein), a contingency bandwidth part based on the reference signal received at 610 and the indication received at 615. For example, the UE 115-d may, based on the reference signal received at 610 and the mapping indicated by the indication received at 615, determine a bandwidth part that includes the mapped random access resource. The UE 115-d may determine the contingency bandwidth part that includes the mapped random access resource. Thus, the UE 115-d may in some cases determine the contingency bandwidth part based on a reference signal, including a reference signal that the UE 115-d may also use to identify candidate beams.

At 630, if the contingency bandwidth part determined at 625 is different than the active bandwidth part, the UE 115-d may switch to utilize the contingency bandwidth part determined at 625. Switching to the contingency bandwidth part may include configuring a transmitter or receiver included in the UE 115-d to use the contingency bandwidth part.

At 635, the UE 115-d and the base station 105-d may perform a random access procedure using the contingency bandwidth part determined at 625. For example, the UE 115-d may transmit to the base station 105-d a beam recovery request (e.g., a beam recovery request as described in reference to process 300).

In some cases, the UE 115-d may determine the random access procedure performed at 635 based on a number of viable candidate beams included in the active bandwidth part. For example, the UE 115-d may determine a number of viable candidate beams included in the active bandwidth part (e.g., by identifying viable candidate beams as described in reference to process 300, which may occur subsequent to or prior to the identification of the failure of the serving beam at 620), and may select a CFRA procedure if the number of viable candidate beams included in the active bandwidth part meets or exceeds threshold, and may select a CBRA procedure if the number of viable candidate beams included in the active bandwidth part is below a threshold. In some cases, the threshold may be one, and the UE 115-d may select a CFRA procedure if the active bandwidth part includes at least one viable candidate beam, and the UE 115-d may select a CBRA procedure if the active bandwidth part includes no viable candidate beam. In some cases, the UE 115-d may determine the random access procedure performed at 635 prior to identifying the failure of the serving beam at 620, but it is to be understood that the UE 115-d may determine the random access procedure performed at 635 at any time.

In some cases, the UE 115-d may determine the random access procedure performed at 635 based on a number of viable candidate beams included in the contingency bandwidth part. For example, the UE 115-d may determine a number of viable candidate beams included in the contingency bandwidth part (e.g., by identifying viable candidate beams as described in reference to process 300, which may occur subsequent to or prior to the identification of the failure of the serving beam at 310), and may select a CFRA procedure if the number of viable candidate beams included in the contingency bandwidth part meets or exceeds threshold, and may select a CBRA procedure if the number of viable candidate beams included in the contingency bandwidth part is below a threshold. In some cases, the threshold may be one, and the UE 115-*d* may select a CFRA procedure if the contingency bandwidth part includes at least one viable candidate beam, and the UE 115-*d* may select a CBRA procedure if the contingency bandwidth part includes no viable candidate beam. In some cases, the UE 115-*d* may determine the random access procedure performed at 635 subsequent to determining the contingency bandwidth part at 624, but it is to be understood that the UE 115-*d* may determine the random access procedure performed at 635 at any time.

Though process 600 utilizes a single contingency bandwidth, it is to be understood that process 600 may be modified to utilize any number of contingency bandwidths. For example, at 610, the indication may indicate a pair of contingency bandwidths, one for uplink and one for downlink, with the UE 115-*d* to use one of the indicated contingency bandwidths for uplink aspects of the random access procedure performed at 635 and the other of the indicated contingency bandwidths for downlink aspects of the random access procedure performed at 635.

Figure 7:
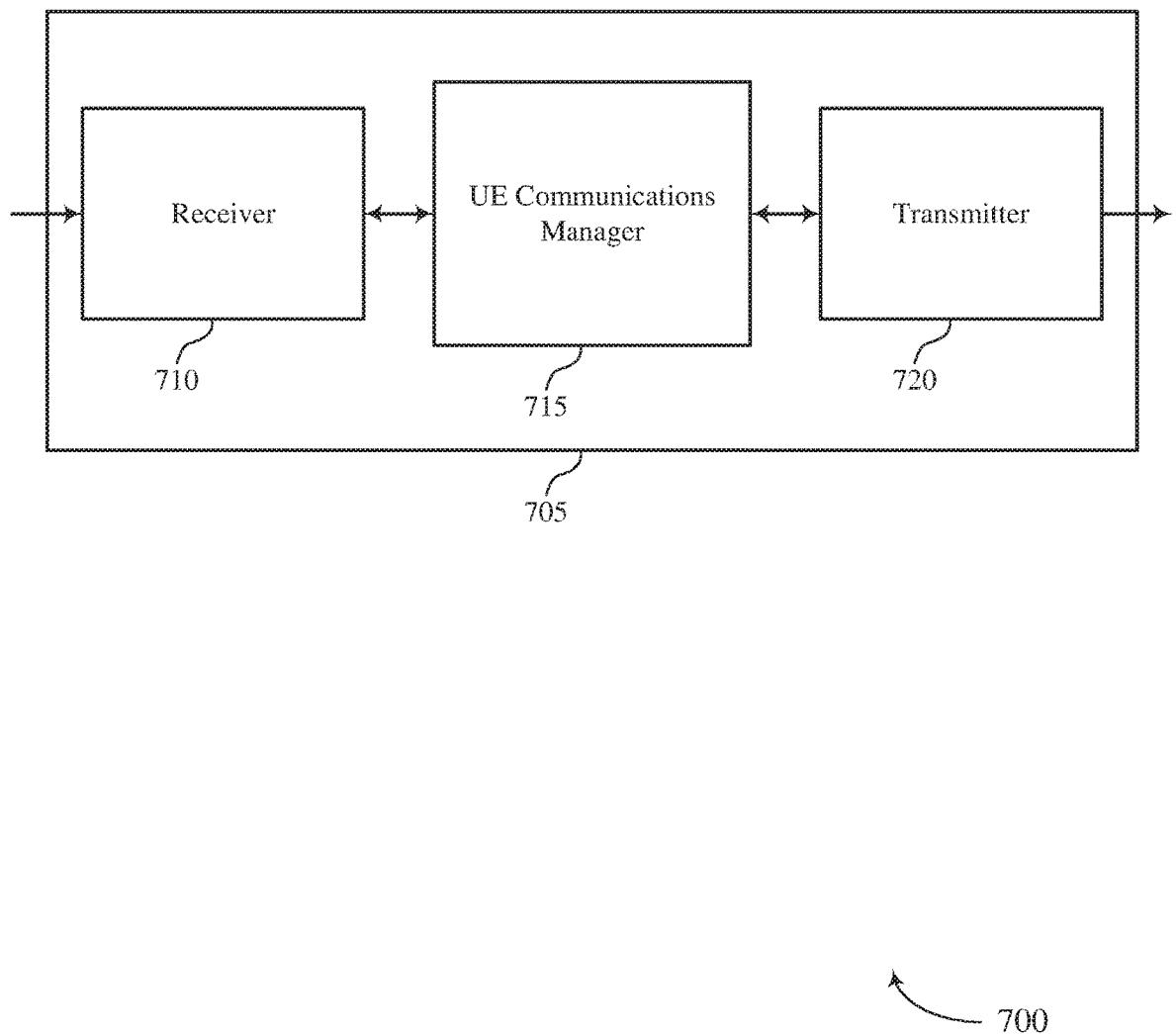
FIGS. 7 through 9 show block diagrams of a device that supports beam recovery in a multiple bandwidth part environment in accordance with aspects of the present disclosure.

FIG. 7 shows a block diagram 700 of a wireless device 705 that supports beam recovery in a multiple bandwidth part environment in accordance with aspects of the present disclosure. Wireless device 705 may be an example of aspects of a user equipment (UE) 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to beam recovery in a multiple bandwidth part environment, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may identify a failure of a serving beam in an active bandwidth part of a carrier utilized by the UE for wireless communication, may determine, for the active bandwidth part of the carrier, a level of support for a random access procedure, may determine, based on the failure of the serving beam and the level of support, a contingency bandwidth part of the carrier supporting the random access procedure, and may perform the random access procedure using the contingency bandwidth part of the carrier.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
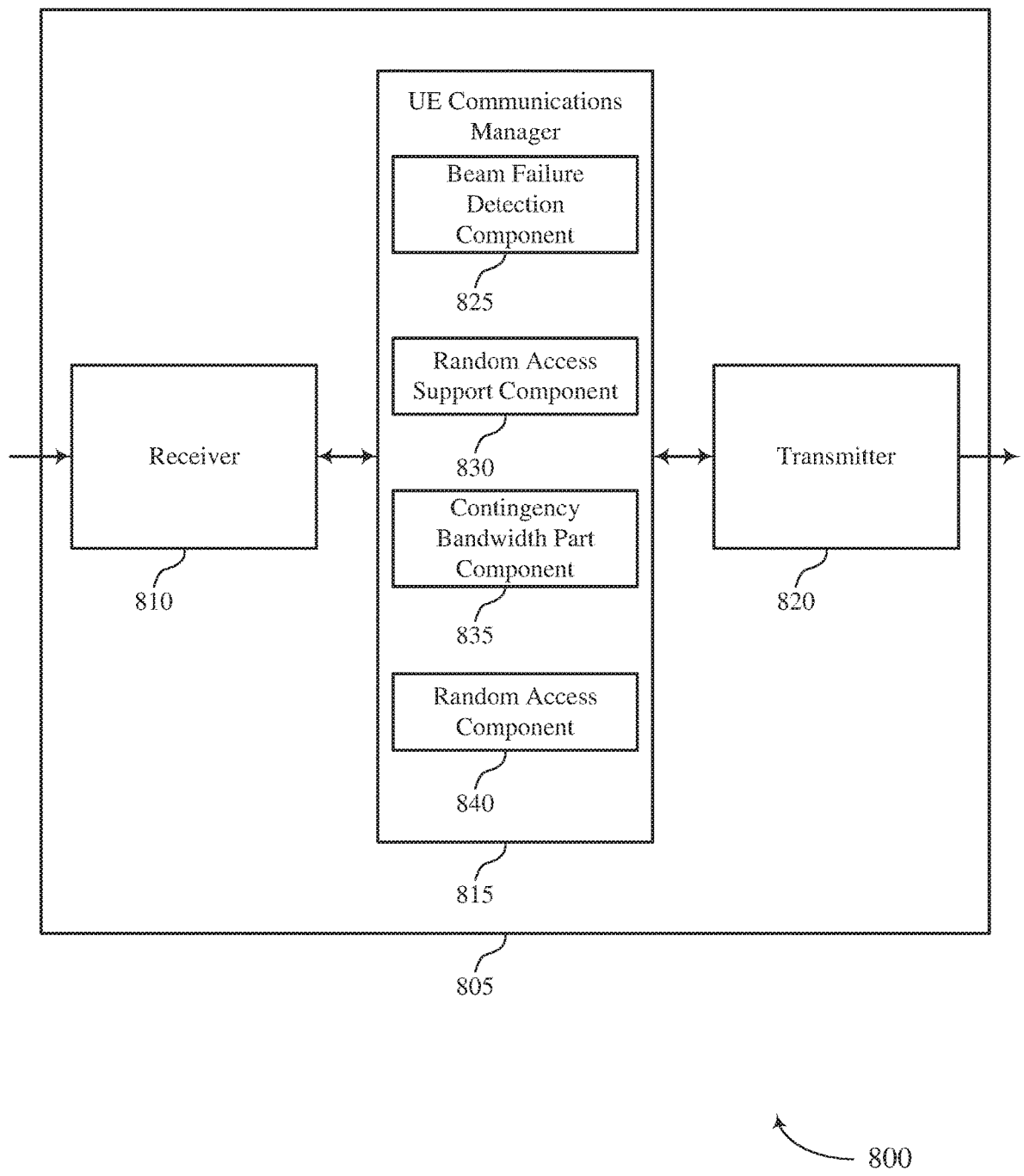

FIG. 8 shows a block diagram 800 of a wireless device 805 that supports beam recovery in a multiple bandwidth part environment in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to beam recovery in a multiple bandwidth part environment, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include beam failure detection component 825, random access support component 830, contingency bandwidth part component 835, and random access component 840.

Beam failure detection component 825 may identify a failure of a serving beam in an active bandwidth part of a carrier utilized by the UE for wireless communication.

Random access support component 830 may determine, for the active bandwidth part of the carrier, a level of support for a random access procedure.

Contingency bandwidth part component 835 may determine, based on the failure of the serving beam and the level of support, a contingency bandwidth part of the carrier supporting the random access procedure. In some cases, contingency bandwidth part component 835 may determine the contingency bandwidth part of the carrier based on a prior random access procedure. In some cases, contingency bandwidth part component 835 may receive, from a base station, an indication of the contingency bandwidth part of the carrier. In some cases, contingency bandwidth part component 835 may determine the contingency bandwidth part of the carrier based on a reference signal transmitted in the active bandwidth part of the carrier. In some cases, the contingency bandwidth part of the carrier is the active bandwidth part of the carrier. In some cases, the active bandwidth part of the carrier is a first bandwidth part, and the contingency bandwidth part of the carrier is a second bandwidth part.

In some cases, contingency bandwidth part component 835 may configure receiver 810 to receive configuration information from a base station and may configure, based at least in part on the configuration information, receiver 810 or transmitter 820 to use the active bandwidth part of the carrier. In some cases, contingency bandwidth part component 835 may configure, based at least in part on determining the contingency bandwidth part of the carrier, receiver 810 or transmitter 820 to use the contingency bandwidth part of the carrier.

Random access component 840 may perform the random access procedure using the contingency bandwidth part of the carrier.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
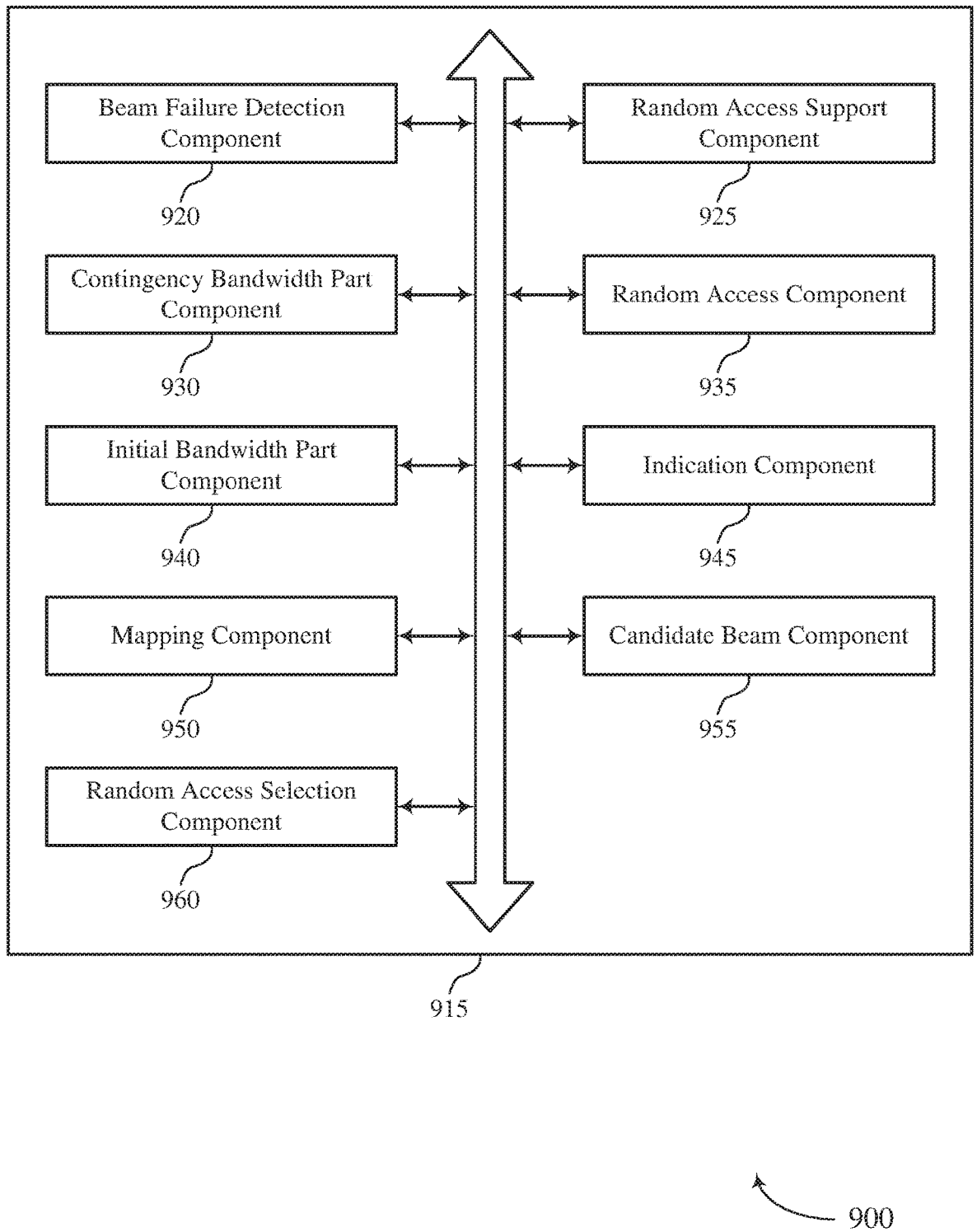

FIG. 9 shows a block diagram 900 of a UE communications manager 915 that supports beam recovery in a multiple bandwidth part environment in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include beam failure detection component 920, random access support component 925, contingency bandwidth part component 930, random access component 935, initial bandwidth part component 940, indication component 945, mapping component 950, candidate beam component 955, and random access selection component 960. Each of these modules may communicate, directly or indirectly, with one another (e.g., via one or more buses).

Beam failure detection component 920 may identify a failure of a serving beam in an active bandwidth part of a carrier utilized by the UE for wireless communication.

Random access support component 925 may determine, for the active bandwidth part of the carrier, a level of support for a random access procedure.

Contingency bandwidth part component 930 may determine, based on the failure of the serving beam and the level of support, a contingency bandwidth part of the carrier supporting the random access procedure. In some cases, the contingency bandwidth part of the carrier is the active bandwidth part of the carrier. In some cases, the active bandwidth part of the carrier is a first bandwidth part, and the contingency bandwidth part of the carrier is a second bandwidth part.

In some cases, contingency bandwidth part component 930 may configure a receiver to receive configuration information from a base station and may configure, based at least in part on the configuration information, the receiver or a transmitter to use the active bandwidth part of the carrier. In some cases, contingency bandwidth part component 930 may configure, based at least in part on determining the contingency bandwidth part of the carrier, a receiver or a transmitter to use the contingency bandwidth part of the carrier.

Random access component 935 may perform the random access procedure using the contingency bandwidth part of the carrier.

In some cases, contingency bandwidth part component 930 may determine the contingency bandwidth part of the carrier based on a prior random access procedure. Determining the contingency bandwidth part of the carrier may include identifying an initial bandwidth part of the carrier as used for the prior random access procedure, and initial bandwidth part component 940 may determine the contingency bandwidth part of the carrier as the initial bandwidth part of the carrier.

In some cases, contingency bandwidth part component 930 may receive, from a base station, an indication of the contingency bandwidth part of the carrier. Indication component 945 may receive the indication of the contingency bandwidth part of the carrier via RRC signaling.

In some cases, contingency bandwidth part component 930 may determine the contingency bandwidth part of the carrier based on a reference signal transmitted in the active bandwidth part of the carrier. Mapping component 950 may identify a mapping between the reference signal and a beam including a random access resource, determine the contingency bandwidth part of the carrier based on the mapping. Mapping component 950 may receive an indication of the mapping via RRC signaling. In some cases, the reference signal is quasi-colocated with the beam including the random access resource. In some cases, the reference signal includes a synchronization signal, a CSI-RS, or a combination thereof. Candidate beam component 955 may identify a candidate beam based on the reference signal.

In some cases, random access selection component 960 may select the random access procedure based on the number of viable candidate beams for the active bandwidth part of the carrier. In some cases, selecting the random access procedure includes selecting the random access procedure as a contention-free random access procedure if the number of viable candidate beams in the active bandwidth part of the carrier is at least one. In some cases, selecting the random access procedure includes: selecting the random access procedure as a contention-based random access procedure if the number of viable candidate beams in the active bandwidth part of the carrier is zero.

In some cases, random access selection component 960 may select the random access procedure based on the number of viable candidate beams for the contingency bandwidth part of the carrier. In some cases, selecting the random access procedure includes selecting the random access procedure as a contention-free random access procedure if the number of viable candidate beams in the contingency bandwidth part of the carrier is at least one. In some cases, selecting the random access procedure includes selecting the random access procedure as a contention-based random access procedure if the number of viable candidate beams in the contingency bandwidth part of the carrier is zero.

Figure 10:
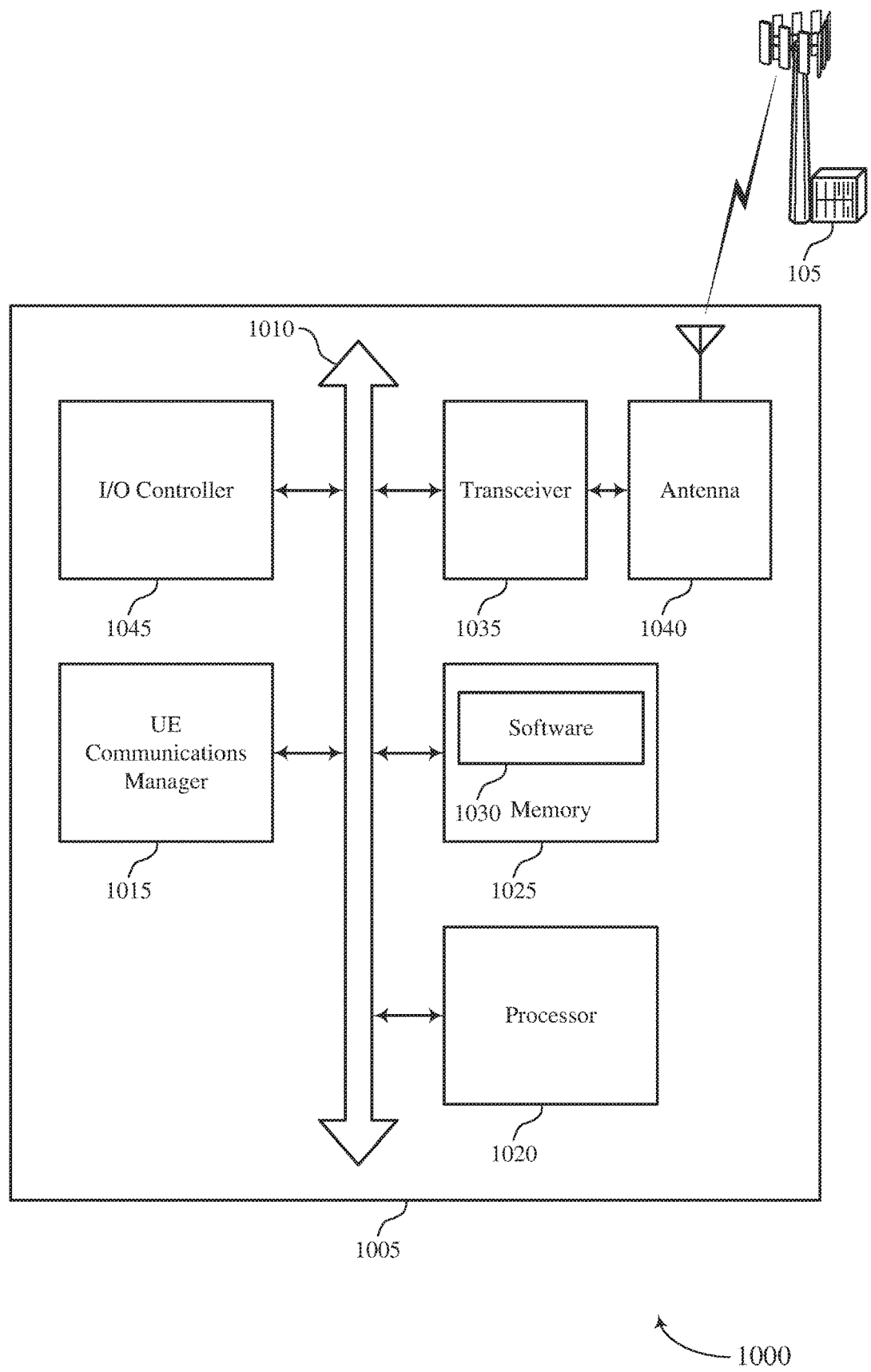
FIG. 10 illustrates a block diagram of a system including a UE that supports beam recovery in a multiple bandwidth part environment in accordance with aspects of the present disclosure.

FIG. 10 shows a diagram of a system 1000 including a device 1005 that supports beam recovery in a multiple bandwidth part environment in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting beam recovery in a multiple bandwidth part environment).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support beam recovery in a multiple bandwidth part environment. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
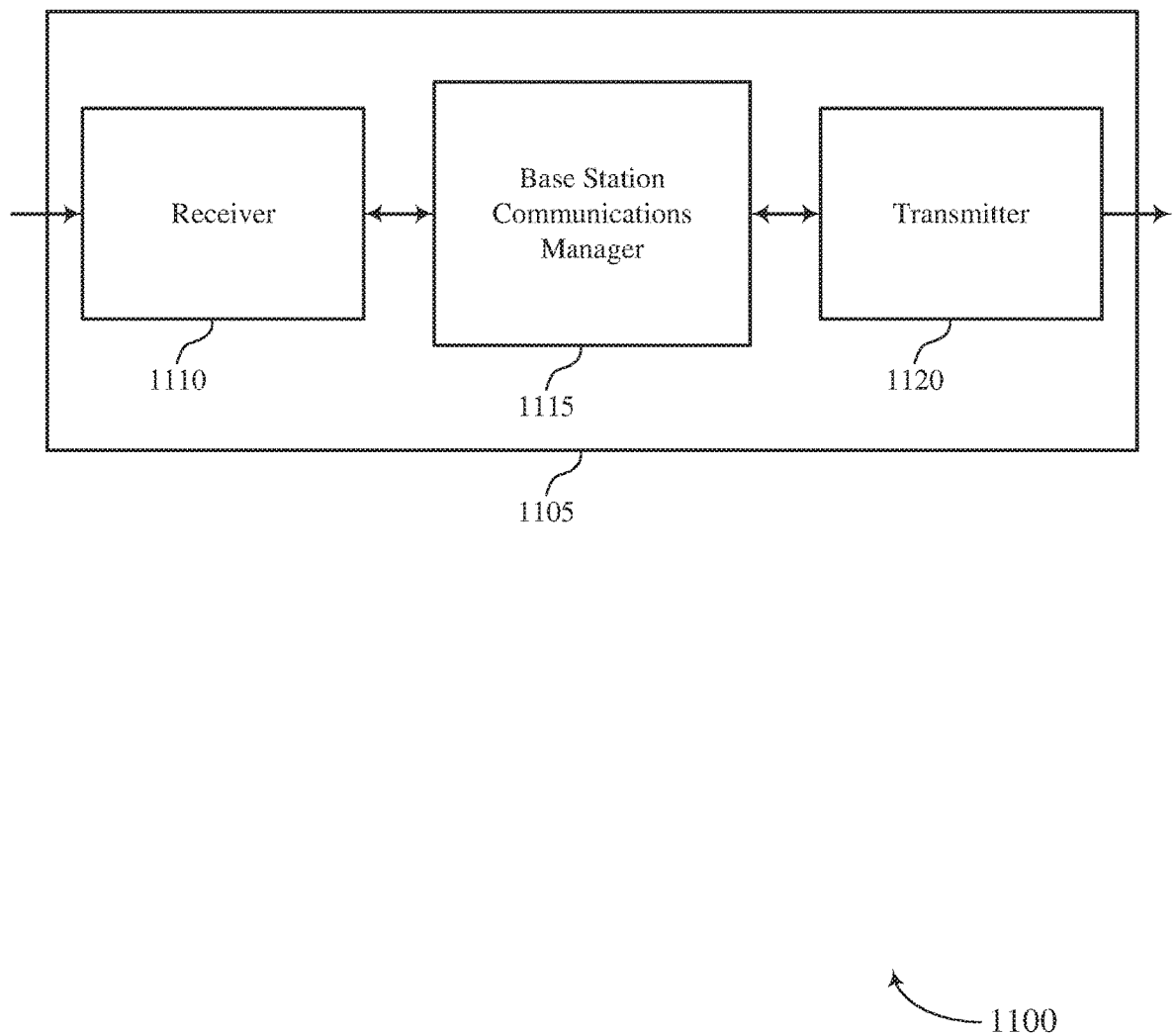
FIGS. 11 through 13 show block diagrams of a device that supports beam recovery in a multiple bandwidth part environment in accordance with aspects of the present disclosure.

FIG. 11 shows a block diagram 1100 of a wireless device 1105 that supports beam recovery in a multiple bandwidth part environment in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to beam recovery in a multiple bandwidth part environment, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may configure a UE to utilize a first bandwidth part of a carrier as an active bandwidth part of the carrier for wireless communication and transmit, to the UE, an indication of a contingency bandwidth part of the carrier to use for a subsequent random access procedure.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
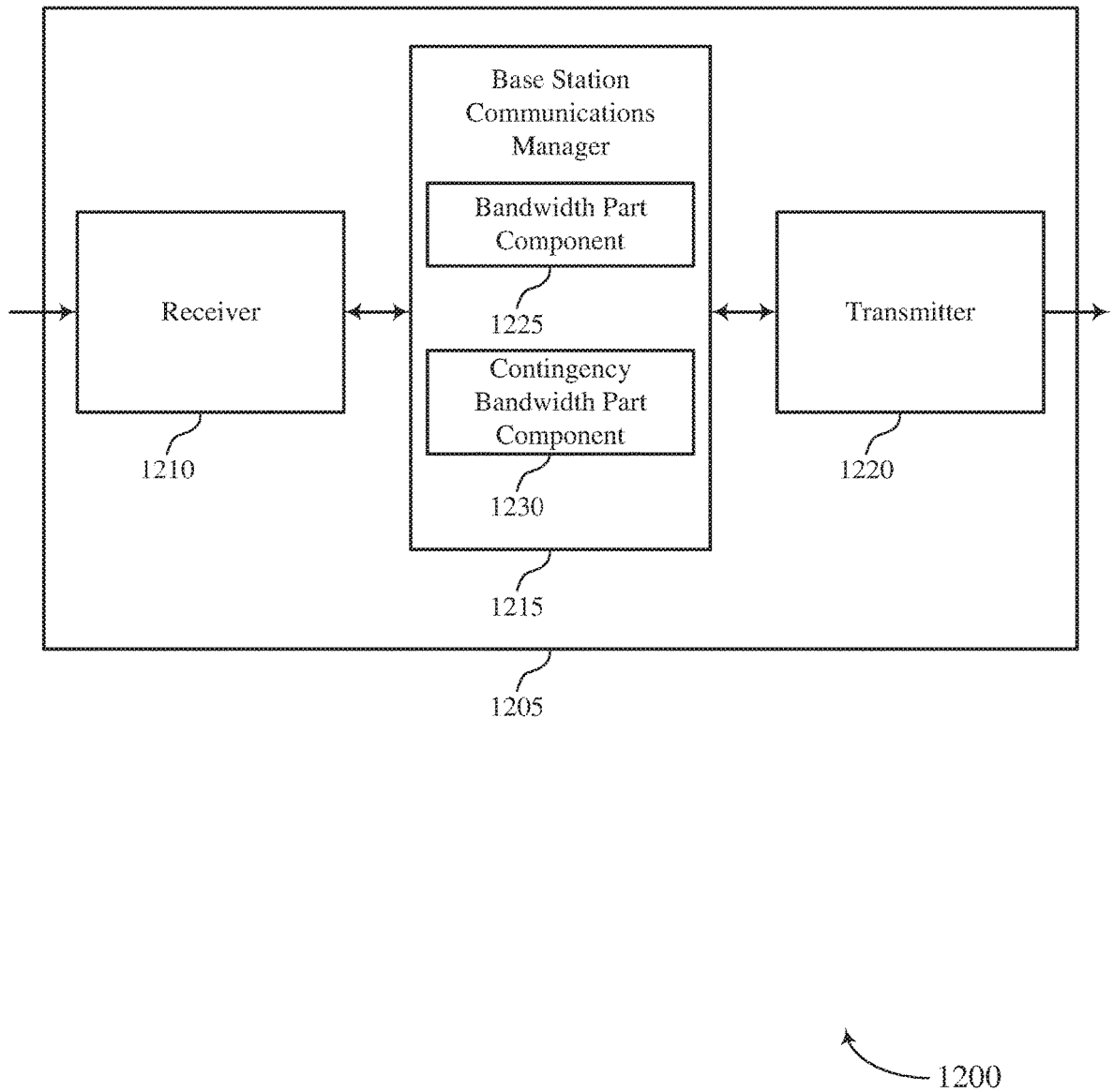

FIG. 12 shows a block diagram 1200 of a wireless device 1205 that supports beam recovery in a multiple bandwidth part environment in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to beam recovery in a multiple bandwidth part environment, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include bandwidth part component 1225 and contingency bandwidth part component 1230.

Bandwidth part component 1225 may configure a UE to utilize a first bandwidth part of a carrier as an active bandwidth part of the carrier for wireless communication.

Contingency bandwidth part component 1230 may transmit, to the UE, an indication of a contingency bandwidth part of the carrier to use for a subsequent random access procedure. In some cases, the contingency bandwidth part of the carrier is the active bandwidth part of the carrier. In some cases, the contingency bandwidth part of the carrier is a second bandwidth part.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
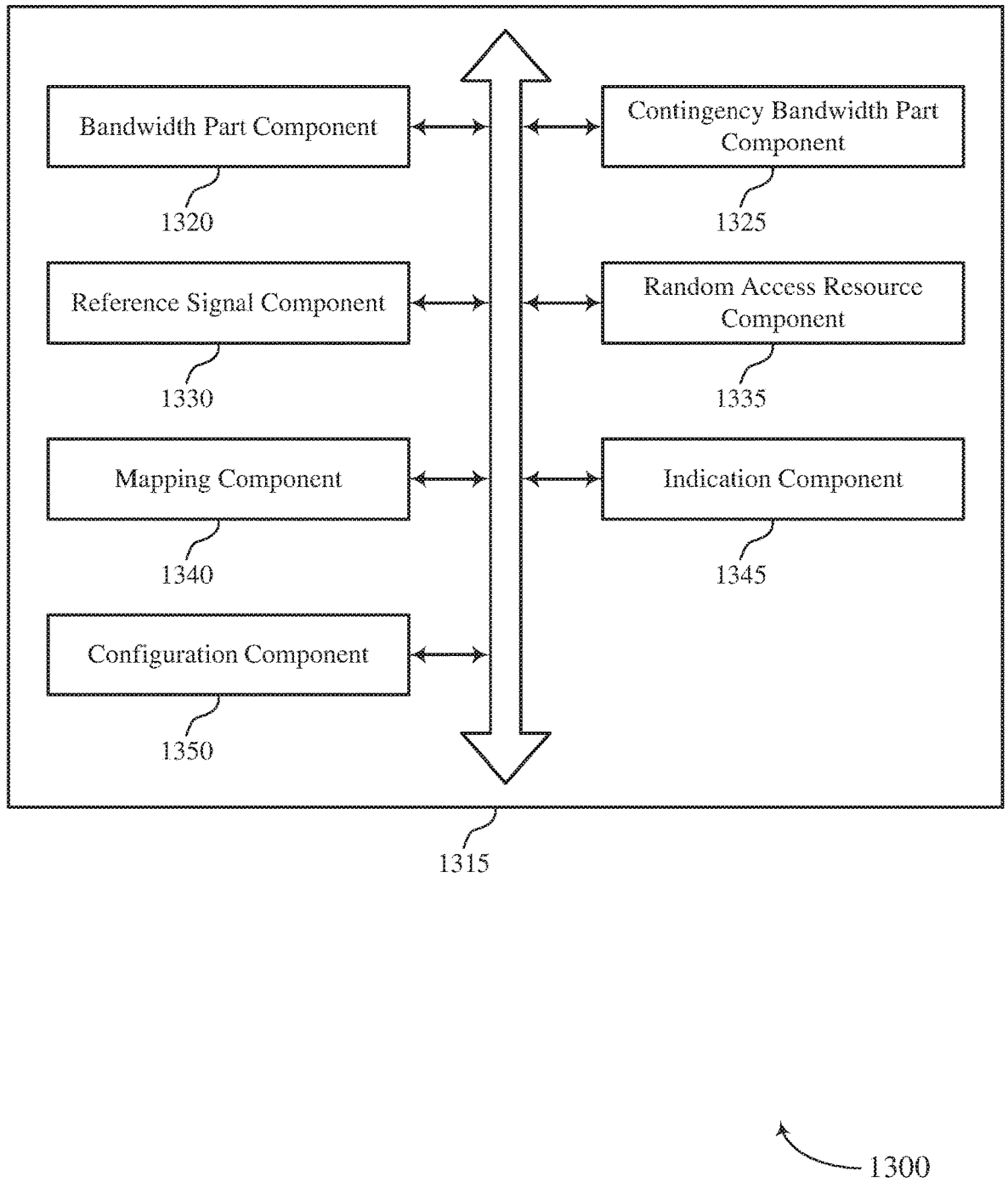

FIG. 13 shows a block diagram 1300 of a base station communications manager 1315 that supports beam recovery in a multiple bandwidth part environment in accordance with aspects of the present disclosure. The base station communications manager 1315 may be an example of aspects of a base station communications manager 1415 described with reference to FIGS. 11, 12, and 14. The base station communications manager 1315 may include bandwidth part component 1320, contingency bandwidth part component 1325, reference signal component 1330, random access resource component 1335, mapping component 1340, indication component 1345, and configuration component 1350. Each of these modules may communicate, directly or indirectly, with one another (e.g., via one or more buses).

Bandwidth part component 1320 may configure a UE to utilize a first bandwidth part of a carrier as an active bandwidth part of the carrier for wireless communication.

Contingency bandwidth part component 1325 may transmit, to the UE, an indication of a contingency bandwidth part of the carrier to use for a subsequent random access procedure. In some cases, the contingency bandwidth part of the carrier is the active bandwidth part of the carrier. In some cases, the contingency bandwidth part of the carrier is a second bandwidth part.

In some cases, transmitting the indication of the contingency bandwidth part of the carrier includes transmitting, to the UE, a reference signal in the active bandwidth part of the carrier. Reference signal component 1330 may transmit the reference signal. Random access resource component 1335 may transmit, to the UE, a beam including a random access resource. Mapping component 1340 may transmit, to the UE, an indication of a mapping between the reference signal and the beam including the random access resource. In some cases, mapping component 1340 may transmit the indication of the mapping via RRC signaling.

In some cases, transmitting the indication of the contingency bandwidth part of the carrier includes transmitting an explicit indication of the contingency bandwidth part of the carrier via RRC signaling. Indication component 1345 may transmit the indication of the contingency bandwidth part.

In some cases, transmitting the indication of the contingency bandwidth part of the carrier includes configuring the UE to determine the contingency bandwidth part of the carrier based on a prior random access procedure by the UE. Configuration component 1350 may configure the UE to determine the contingency bandwidth part of the carrier based on a prior random access procedure by the UE.

Figure 14:
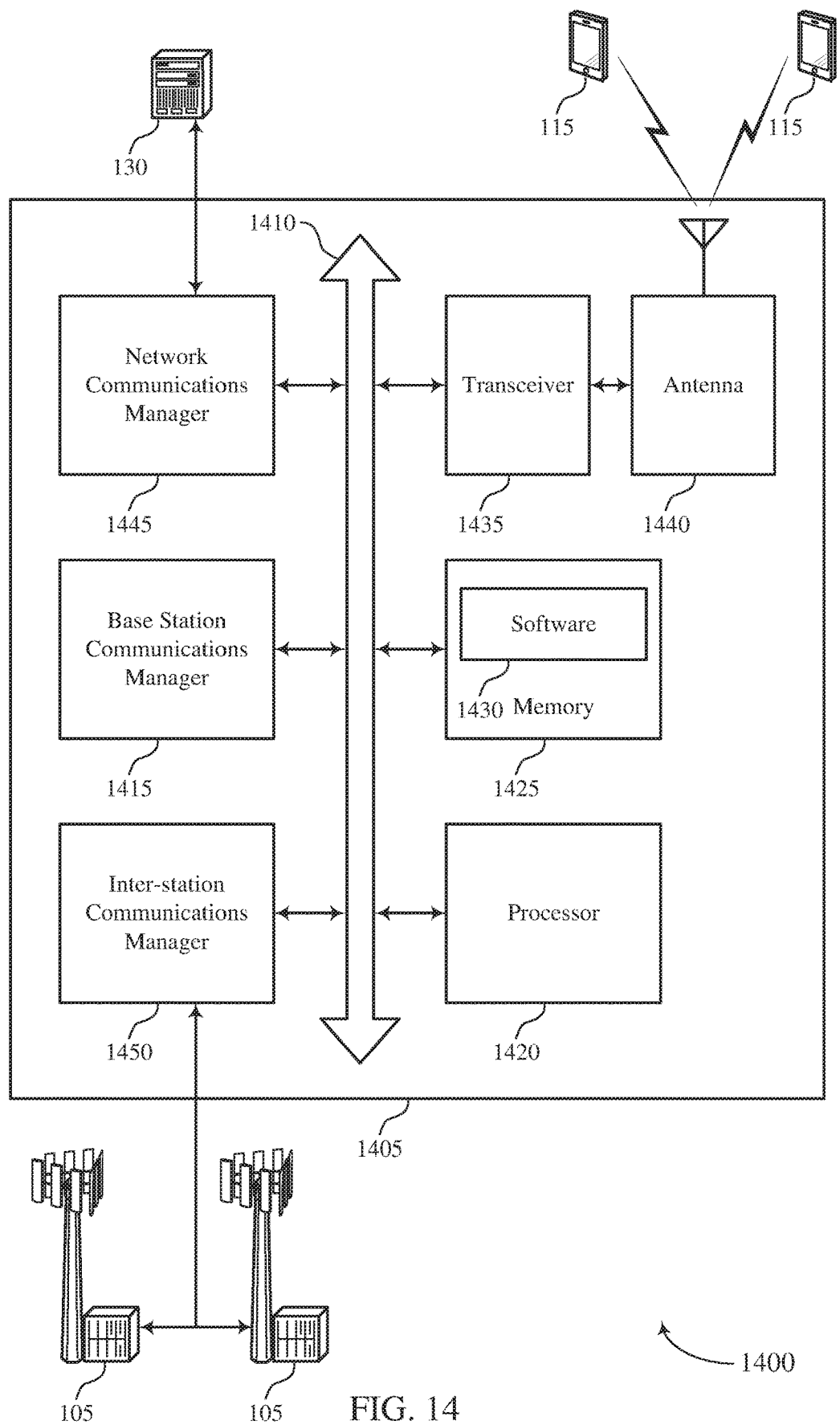
FIG. 14 illustrates a block diagram of a system including a base station that supports beam recovery in a multiple bandwidth part environment in accordance with aspects of the present disclosure.

FIG. 14 shows a diagram of a system 1400 including a device 1405 that supports beam recovery in a multiple bandwidth part environment in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting beam recovery in a multiple bandwidth part environment).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support beam recovery in a multiple bandwidth part environment. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
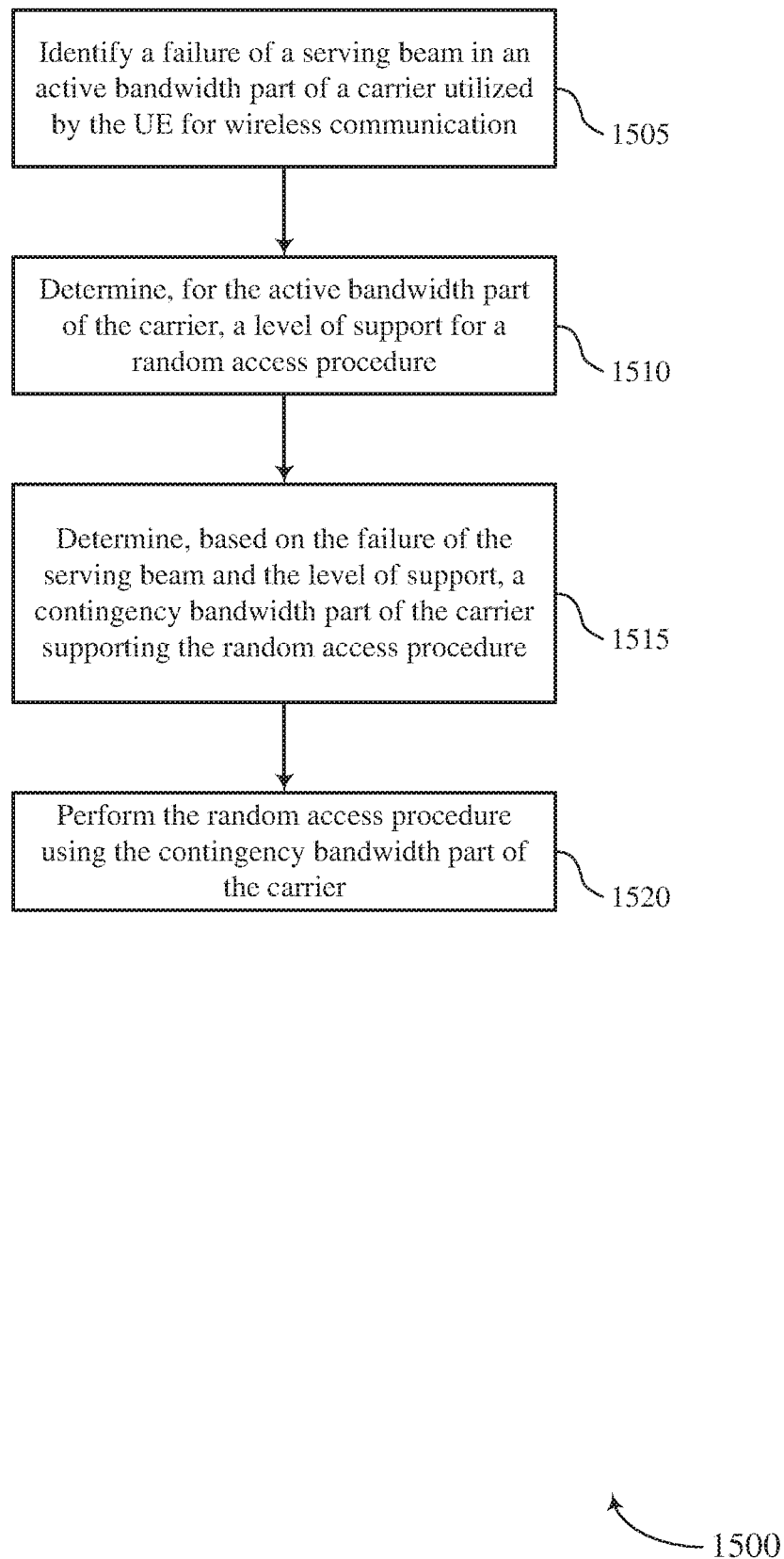
FIGS. 15 through 16 illustrate methods for beam recovery in a multiple bandwidth part environment in accordance with aspects of the present disclosure.

FIG. 15 shows a flowchart illustrating a method 1500 for beam recovery in a multiple bandwidth part environment in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may identify a failure of a serving beam in an active bandwidth part of a carrier utilized by the UE for wireless communication. The operations of 1505 may be performed according to the methods described herein. In certain examples, aspects of the operations of 1505 may be performed by a beam failure detection component as described with reference to FIGS. 7 through 10.

At 1510 the UE 115 may determine, for the active bandwidth part of the carrier, a level of support for a random access procedure. The operations of 1510 may be performed according to the methods described herein. In certain examples, aspects of the operations of 1510 may be performed by a random access support component as described with reference to FIGS. 7 through 10.

At 1515 the UE 115 may determine, based at least in part on the failure of the serving beam and the level of support, a contingency bandwidth part of the carrier supporting the random access procedure. The operations of 1515 may be performed according to the methods described herein. In certain examples, aspects of the operations of 1515 may be performed by a contingency bandwidth part component as described with reference to FIGS. 7 through 10.

At 1520 the UE 115 may perform the random access procedure using the contingency bandwidth part of the carrier. The operations of 1520 may be performed according to the methods described herein. In certain examples, aspects of the operations of 1520 may be performed by a random access component as described with reference to FIGS. 7 through 10.

Figure 16:
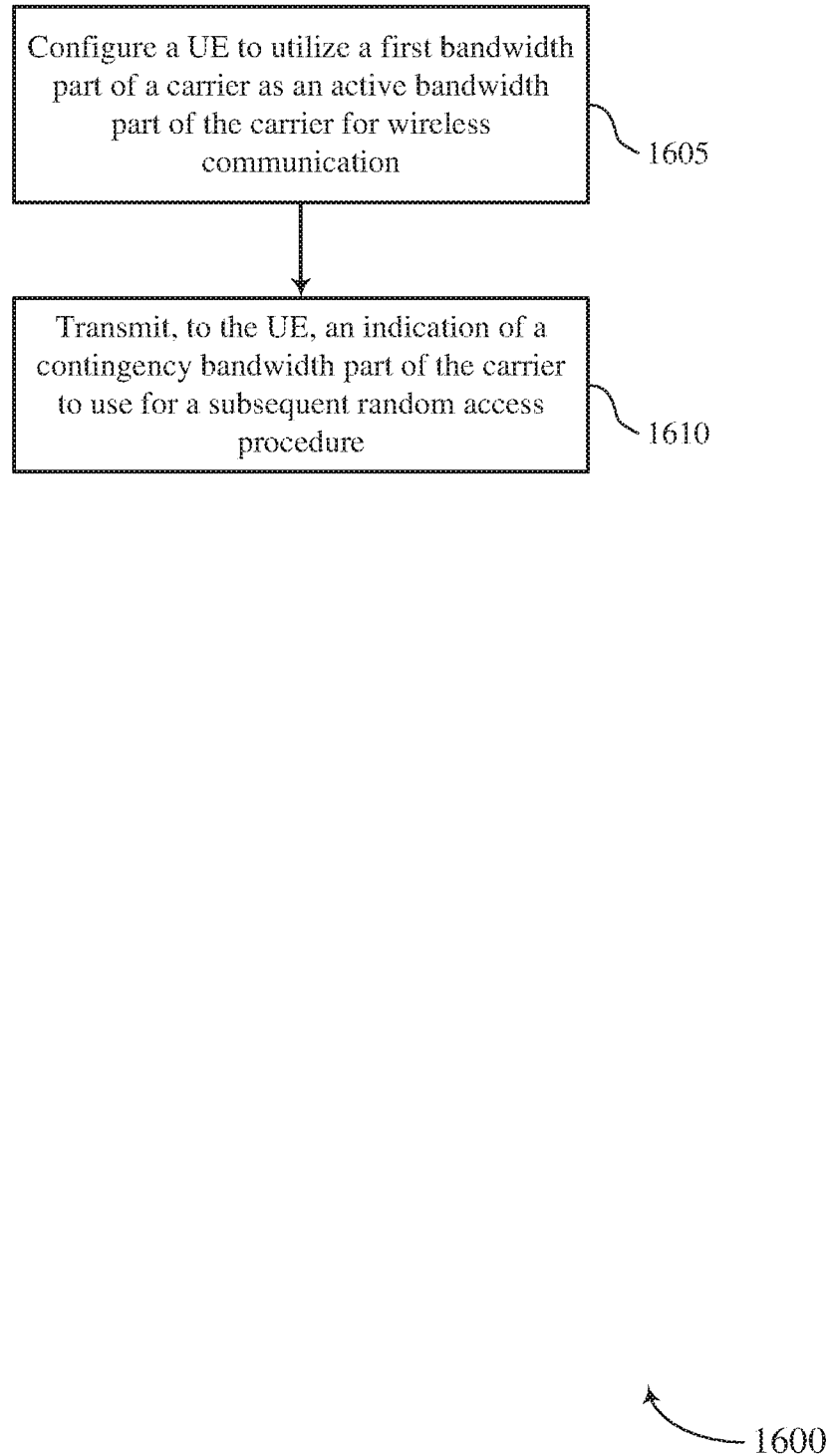

FIG. 16 shows a flowchart illustrating a method 1600 for beam recovery in a multiple bandwidth part environment in accordance with aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may configure a user equipment (UE) to utilize a first bandwidth part of a carrier as an active bandwidth part of the carrier for wireless communication. The operations of 1605 may be performed according to the methods described herein. In certain examples, aspects of the operations of 1605 may be performed by a bandwidth part component as described with reference to FIGS. 11 through 14.

At 1610 the base station 105 may transmit, to the UE, an indication of a contingency bandwidth part of the carrier to use for a subsequent random access procedure. The operations of 1610 may be performed according to the methods described herein. In certain examples, aspects of the operations of 1610 may be performed by a contingency bandwidth part component as described with reference to FIGS. 11 through 14.

It should be noted that the methods and processes described above describe possible implementations, and that the operations and the steps may be rearranged or otherwise modified and that other implementations are possible. Further, aspects from two or more of the methods or processes may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
identifying a failure of a serving beam in an active bandwidth part of a carrier utilized by the UE for wireless communication;
determining, for the active bandwidth part, a level of support for a random access procedure;
determining, based at least in part on the failure of the serving beam and the level of support, a contingency bandwidth part supporting the random access procedure;
determining the contingency bandwidth part based at least in part on a prior random access procedure; and
performing the random access procedure using the contingency bandwidth part in response to the failure.

2. The method of claim 1, further comprising:
receiving, from a network device, an indication via radio resource control (RRC) signaling of the contingency bandwidth part.

3. The method of claim 2, wherein determining the contingency bandwidth part comprises:
identifying an initial bandwidth part as used for the prior random access procedure; and
determining the contingency bandwidth part as the initial bandwidth part.

4. The method of claim 1, further comprising:
determining the contingency bandwidth part based at least in part on a reference signal transmitted in the active bandwidth part.

5. The method of claim 4, further comprising:
identifying a mapping between the reference signal and a beam comprising a random access resource; and
determining the contingency bandwidth part based at least in part on the mapping.

6. The method of claim 5, further comprising:
receiving an indication of the mapping via radio resource control (RRC) signaling.

7. The method of claim 5, wherein the reference signal is quasi-colocated with the beam comprising the random access resource.

8. The method of claim 4, further comprising:
identifying a candidate beam based at least in part on the reference signal.

9. The method of claim 4, wherein the reference signal comprises a synchronization signal, a channel state information reference signal (CSI-RS), or a combination thereof.

10. The method of claim 1, wherein performing the random access procedure using the contingency bandwidth part comprises:
determining a number of viable candidate beams for the active bandwidth part; and
selecting the random access procedure based at least in part on the number of viable candidate beams for the active bandwidth part.

11. The method of claim 10, wherein selecting the random access procedure comprises:
selecting the random access procedure as a contention-free random access procedure if the number of viable candidate beams in the active bandwidth part is at least one.

12. The method of claim 10, wherein selecting the random access procedure comprises:
selecting the random access procedure as a contention-based random access procedure if the number of viable candidate beams in the active bandwidth part is zero.

13. The method of claim 1, wherein performing the random access procedure using the contingency bandwidth part comprises:
determining a number of viable candidate beams for the contingency bandwidth part; and
selecting the random access procedure based at least in part on the number of viable candidate beams for the contingency bandwidth part.

14. The method of claim 13, wherein selecting the random access procedure comprises:
selecting the random access procedure as a contention-free random access procedure if the number of viable candidate beams in the contingency bandwidth part is at least one.

15. The method of claim 13, wherein selecting the random access procedure comprises:
selecting the random access procedure as a contention-based random access procedure if the number of viable candidate beams in the contingency bandwidth part is zero.

16. The method of claim 1, wherein the contingency bandwidth part is the active bandwidth part.

17. The method of claim 1, wherein:
the active bandwidth part is a first bandwidth part; and
the contingency bandwidth part is a second bandwidth part.

18. A method for wireless communication, comprising:
configuring a user equipment (UE) to utilize a first bandwidth part as an active bandwidth part for wireless communication; and
transmitting, to the UE, an indication of a contingency bandwidth part in which to perform beam recovery as part of a subsequent random access procedure in response to a failure of a serving beam in an active bandwidth part utilized by the UE for wireless communication, wherein the contingency bandwidth part is based at least in part on a prior random access procedure.

19. The method of claim 18, wherein transmitting the indication of the contingency bandwidth part comprises:
transmitting, to the UE, a reference signal in the active bandwidth part;
transmitting, to the UE, a beam comprising a random access resource; and
transmitting, to the UE, an indication of a mapping between the reference signal and the beam comprising the random access resource.

20. The method of claim 19, wherein transmitting the indication of the mapping comprises:
transmitting the indication of the mapping via radio resource control (RRC) signaling.

21. The method of claim 18, wherein transmitting the indication of the contingency bandwidth part comprises:

transmitting an explicit indication of the contingency bandwidth part via radio resource control (RRC) signaling.

22. The method of claim 18, wherein the contingency bandwidth part is the active bandwidth part.

23. The method of claim 18, wherein the contingency bandwidth part is a second bandwidth part.

24. An apparatus for wireless communication at a user equipment (UE), comprising:
means for identifying a failure of a serving beam in an active bandwidth part utilized by the UE for wireless communication;
means for determining, for the active bandwidth part, a level of support for a random access procedure;
means for determining, based at least in part on the failure of the serving beam and the level of support, a contingency bandwidth part supporting the random access procedure, wherein the contingency bandwidth part is based at least in part on a prior random access procedure; and
means for performing the random access procedure using the contingency bandwidth part in response to the failure.

25. An apparatus for wireless communication, comprising:
means for configuring a user equipment (UE) to utilize a first bandwidth part as an active bandwidth part for wireless communication; and
means for transmitting, to the UE, an indication of a contingency bandwidth part in which to perform beam recovery as part of a subsequent random access procedure in response to a failure of a serving beam in an active bandwidth part utilized by the UE for wireless communication, wherein the contingency bandwidth part is based at least in part on a prior random access procedure.

26. An apparatus for wireless communication at a user equipment (UE), comprising:
a processor;
memory in electronic communication with the processor; and
instructions stored in the memory and executable by the processor to cause the apparatus to:
identify a failure of a serving beam in an active bandwidth part of a carrier utilized by the UE for wireless communication;
determine, for the active bandwidth part, a level of support for a random access procedure;
determine, based at least in part on the failure of the serving beam and the level of support, a contingency bandwidth part supporting the random access procedure, wherein the contingency bandwidth part is based at least in part on a prior random access procedure; and
perform the random access procedure using the contingency bandwidth part in response to the failure.

27. The apparatus of claim 26, further comprising:
a receiver;
a transmitter; and
instructions stored in the memory and executable by the processor to cause the apparatus to:
receive, via the receiver, configuration information from a network device; and
configure, based at least in part on the configuration information, the receiver or the transmitter to use the active bandwidth part.

28. The apparatus of claim 26, further comprising:
a receiver;
a transmitter; and
instructions stored in the memory and executable by the processor to cause the apparatus to:
configure, based at least in part on determining the contingency bandwidth part, the receiver or the transmitter to use the contingency bandwidth part.

29. An apparatus for wireless communication, comprising:
a processor;
memory in electronic communication with the processor; and
instructions stored in the memory and executable by the processor to cause the apparatus to:
configure a user equipment (UE) to utilize a first bandwidth part as an active bandwidth part for wireless communication; and
transmit, to the UE, an indication of a contingency bandwidth part in which to perform beam recovery as part of a subsequent random access procedure in response to a failure of a serving beam in an active bandwidth part utilized by the UE for wireless communication, wherein the contingency bandwidth part is based at least in part on a prior random access procedure.

30. A non-transitory computer-readable medium storing code for wireless communication at a user equipment (UE), the code comprising instructions executable by a processor to:
identify a failure of a serving beam in an active bandwidth part utilized by the UE for wireless communication;
determine, for the active bandwidth part, a level of support for a random access procedure;
determine, based at least in part on the failure of the serving beam and the level of support, a contingency bandwidth part supporting the random access procedure, wherein the contingency bandwidth part based at least in part on a prior random access procedure; and
perform the random access procedure using the contingency bandwidth part in response to the failure.

31. A non-transitory computer-readable medium storing code for wireless communication, the code comprising instructions executable by a processor to:
configure a user equipment (UE) to utilize a first bandwidth part as an active bandwidth part for wireless communication; and
transmit, to the UE, an indication of a contingency bandwidth part in which to perform beam recovery as part of a subsequent random access procedure in response to a failure of a serving beam in an active bandwidth part utilized by the UE for wireless communication, wherein the contingency bandwidth part is based at least in part on a prior random access procedure.

* * * * *